(12) United States Patent
Baur et al.

(10) Patent No.: US 6,987,277 B2
(45) Date of Patent: Jan. 17, 2006

(54) SYSTEMS AND METHOD FOR PICKING AND PLACING OF NANOSCALE OBJECTS UTILIZING DIFFERENCES IN CHEMICAL AND PHYSICAL BINDING FORCES

(75) Inventors: Christof Baur, Dallas, TX (US); Richard E. Stallcup, II, Little Elm, TX (US)

(73) Assignee: Zyvex Corporation, Richardson, TX (US)

( * ) Notice: Subject to any disclaimer, the term of this patent is extended or adjusted under 35 U.S.C. 154(b) by 8 days.

(21) Appl. No.: 10/684,120

(22) Filed: Oct. 10, 2003

(65) Prior Publication Data

US 2005/0077468 A1   Apr. 14, 2005

(51) Int. Cl.
  *B82B 3/00*   (2006.01)
(52) U.S. Cl. ............... 250/492.2; 73/105; 427/552; 427/596; 438/676; 438/771; 977/104 Y; 977/107 R; 977/109 T
(58) Field of Classification Search ............... 250/307, 250/492.2, 492.3, 306; 73/105; 427/552, 427/596; 438/676, 771
  See application file for complete search history.

(56) References Cited

U.S. PATENT DOCUMENTS

| | | | |
|---|---|---|---|
| 4,987,312 A * | 1/1991 | Eigler | 250/492.3 |
| 5,144,148 A | 9/1992 | Eigler | |
| 6,331,454 B1 * | 12/2001 | Yamada et al. | 438/128 |

OTHER PUBLICATIONS

C. Baur, A. Bugacov, B.E. Koel, A. Madhukar, N. Montoya, T.R. Ramachandran, A.A.R. Requicha, R. Resch and P. Will; *Nanoparticle manipulation by mechanical pushing: underlying phenomena and real-time monitoring*; Nanotechnology 9 360-364; Aug. 7, 1998.

T. Nakayama, D.H. Huang, M. Aono; *Extraction, deposition, and displacement of atoms by STM*; Microelectronic Engineering 32 (1996) 191-201.

P. Moriarty, Y.R. MA, M.D. Upward, P.H. Beton; *Translation, rotation and removal of C60 on Si(100)—2 × 1 using anisotropic molecular manipulation*; Surface Science 407 (1998) 27-35.

John M. Michelsen, Mark J. Dyer, Jim Von Ehr; *Assembler Construction by Proximal Probe*; Ppaer presented at the 5th Foresight Conference on Molecular Nanotechnology; Nov. 5-8, 1997, Palo Alto, CA.

H. Tang, M.T. Cuberes, C. Joachim, J.K. Gimzewski; *Fundamental considerations in the manipulation of a single C60 molecule on a surface with an STM*; Surface Science 386 (1997) 115-123.

Jim Gimzewski; *Atoms get a big push, or is that a pull?* Physicis World, Nov. 1997, pp. 27, 28.

James K. Gimzewski, Christian Joachim; *Nanoscale Science of Single Molecules Using Local Probes*; Nature vol. 283, Mar. 12, 1999; pp.1683-1686 .

D. M. Eigler, E.K. Schweizer; *Positioning single atoms with a scanning tunnelling microscope*; Letters to Nature vol. 344, Apr. 5, 1990; pp. 524-526.

Michael R. Falvo, Richard Superfine; *Mechanics and friction at the nanometer scale*; Dept. of Physics and Astronomy, The University of North Carolina at Chapel Hill; pp. 1-17.

(Continued)

Primary Examiner—Jack I. Berman
(74) Attorney, Agent, or Firm—Haynes and Boone, LLP

(57) ABSTRACT

A method for manipulating a nanoscale object deposited on a substrate. The surface of the substrate is passive. A target position is formed on the passive surface by the action of the tip of a scanning probe microscope. The nanoscale object is picked from its initial position by the tip of the scanning probe microscope, then placed and released at the target position.

23 Claims, 12 Drawing Sheets

OTHER PUBLICATIONS

H.J. Lee, W. Ho; *Single-Bond Formation and Characterization with a Scanning Tunneling Microscope*; Science Reports vol. 286; Nov. 26, 1999; pp. 1719-1722.

Seiji Heike, Tomihiro Hashizume, Yasuo Wada; *Nanoneedle formation on silicon (111) surface using a scanning tunneling microscope tip*; J. Appl. Phys. 80 (7); Oct. 1, 1996; pp. 4182-4188.

D.H. Huang, Y. Yamamoto; *Physical mechanism of hydrogen deposition from a scanning tunneling microscopy tip*; Applied Physics A 64 (1997); pp. 419-422.

J.W. Lyding, T.C. Shen, J.S. Hubacek, J.R. Tucker, G.C. Abeln; *Nanoscale patterning and oxidation of H-passivated Si(100)—2 × 1 surfaces with an ultrahigh vacuum scanning tunneling microscope*; Appl. Phys. Lett. 64 (15); Apr. 11, 1994; pp. 2010-2012.

Dehuan Huang, Hironaga Uchida; *Deposition and subsequent removal of single Si atoms on the Si(111)—7× 7 surface by a scanning tunneling microscope*; J. Vac. Sci. Technol. B 12 (4); Jul./Aug. 1994; pp. 2429-2433.

D. Chen, R.K Workman, D. Sarid; *Adsorption and decomposition of C60 molecules on Si(111) surfaces*; J. Vac. Sci. Technol. B 14 (2), Mar./Apr. 1996; pp. 979-981.

P.H. Beton, A.W. Dunn, P. Moriarty; *Manipulation of C60 molecules on a Si surface*; Appl. Phys. Lett. 67 (8); pp. 1075-1077; Aug. 21, 1995.

H. Takashima, M. Nakaya, A. Yamamoto, A. Hashimoto; *Two-step growth of C60 films on H-termintaed Si (111) substrate*; Journal of Crystal Growth 227-228 (2001), pp. 825-828.

F. Owman, P. Martensson; *STM study of structural defects on in situ prepared Si(111) X 1-H surfaces*; Surface Science 324 (1995), pp. 211-225.

M.T. Cuberes, R.R. Schlittler, J.K. Gimzewski; *Manipulation of $C_{60}$ Cu(111) surfaces using a scanning tunneling microscope*; Appl. Phys. A 66, S669-S673 (1998).

J.T. Li, W.D. Schneider, R. Berndt; *Low-temperature manipulation of Ag atoms and clusters on a Ag (11) surface*; Appl. Phys. A 66, S675-S678 (1998).

M.T. Cuberes, R.R. Schlittler, J.K. Gimzewski; *Supramolecular assembly of individual $C_{60}$ molecules on a monolayer of 4, 4'-dimethylbianthrone molecules*; Appl. Phys. A 66, S745-S748 (1998).

T. Shimizu, J.T. Kim. H. Tokumoto; *Tungsten silicide formation on an STM tip during atom manipulation*; Appl. Phys. A 66, S771-S775 (1998).

G. Meyer, L. Bartels , S. Zöphel, K.H. Rieder; *Lateral manipulation of adatoms and native substrate atoms with the low-temperature scanning tunneling microscope*; Appl. Phys. A 68, 125-129 (1999).

X. Hu, P. Von Blanckenhagen; *Nano-scale metal cluster deposition using STM*; Appl. Phys. A 68, 137-143 (1999).

A.A.G. Requicha, S. Meltzer, R. Resch, D. Lewis, B.E. Koel, M.E. Thompson; *Layered nanoassembly of three-dimensional structures*; Laboratory for Molecular Robotics, University of Southern California.

J.W. Lyding. G.C. Abein, T.C. Shen, C. Wang, J.R.Tucker; *Nanometer scale patterning and oxidation of silicon surfaces with an ultrahigh vacuum scanning tunneling microscope*; J. Vac. Sci. Technol. B 12(6), Nov/Dec 1994, pp. 3735-3740.

G.C. Abein, M.C. Hersam, D.S. Thompson, S.T. Hwang, H. Choi, J.S. Moore, and J.W. Lyding; *Approaches to nanofabrication on Si(100) surfaces: Selective area chemical vapor deposition of metals and selective chemisorption of organic molecules*; J. Vac. Sci, Technol. B 16(6), Nov/Dec 1998, pp. 3874-3878.

R. Resch, C. Baur, A. Bugacov, B.E. Koel, A. Madhukar, A.A.G. Requicha, P. Will; *Building and manipulating three-dimensional and linked two-dimensional structures of nanoparticles using scanning force microscopy*; Langmuir The ACS Journal of Surfaces and Colloids, Nov. 10, 1998, vol. 14, No. 23.

J.S. Foster, J.E. Frommer, P.C. Arnett; *Molecular manipulation using a tunneling microscope*; IBM Research Division, Almaden Research Center; San Jose, California; Nature vol. 331, Jan. 28, 1988, pp. 324-326.

G. Dujardin, A. Mayne, O. Robert, F. Rose, C. Joachim, H. Tang; *Vertical manipulation of individual atoms by a direct STM tip-surface contact on Ge(111)*; Physical Review Letters, vol. 80, No. 14, Apr. 6, 1998, pp. 3085-3088.

Saw-Wai Hla; Ludwig Bartels, Gerhard Meyer, Karl-Heinz Rieder; *Inducing all steps of a chemical reaction with the scanning tunneling microscope tip: towards single molecule engineering*; Physical Review Letters, vol. 85, No. 13, Sep. 25, 2000, pp. 2777-2780.

In-Whan Lyo, Phaedon Avouris; *Field-induced nanometer-to atomic-scale manipulation of silicon surfaces with the STM*; IBM Research Division, T.J. Watson Research Center, Yorktown Heights, NY; Science vol. 253; pp. 173-176.

Saw-Wai Hla, Karl-Heinz Rieder; *Engineering of single molecules with a scanning tunneling microscope tip*; Superlattices and Microstructures, vol. 31, No. 1, 2002, pp. 63-72.

\* cited by examiner

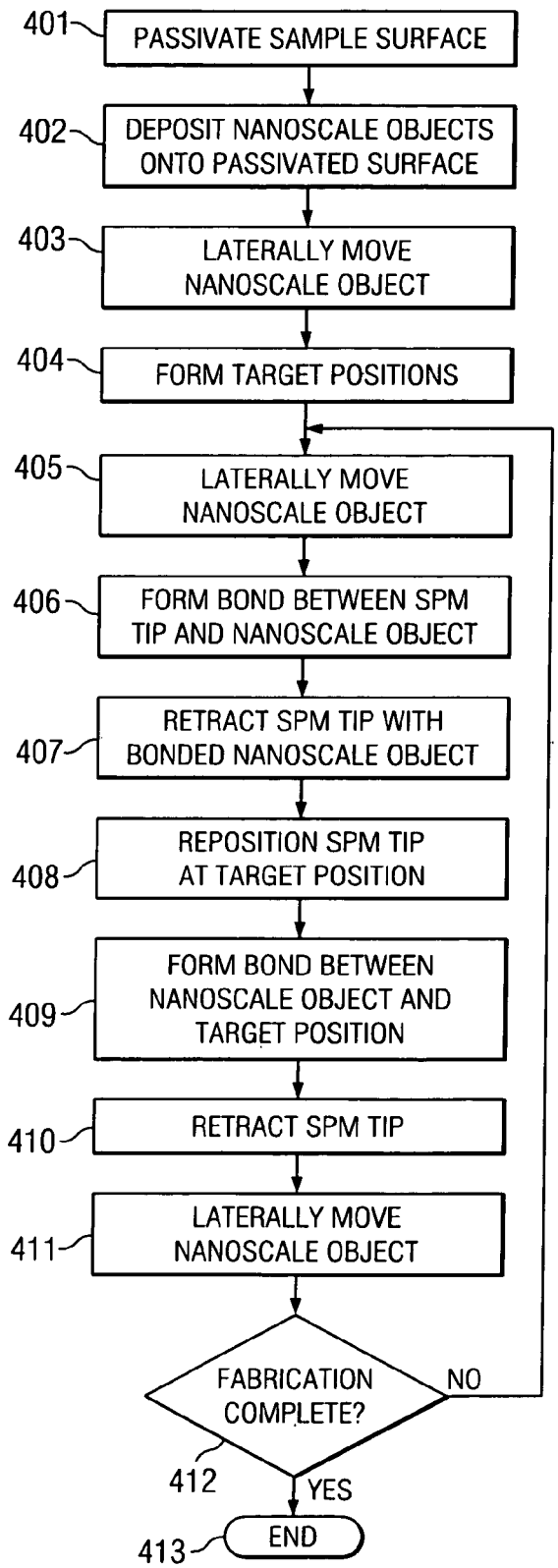
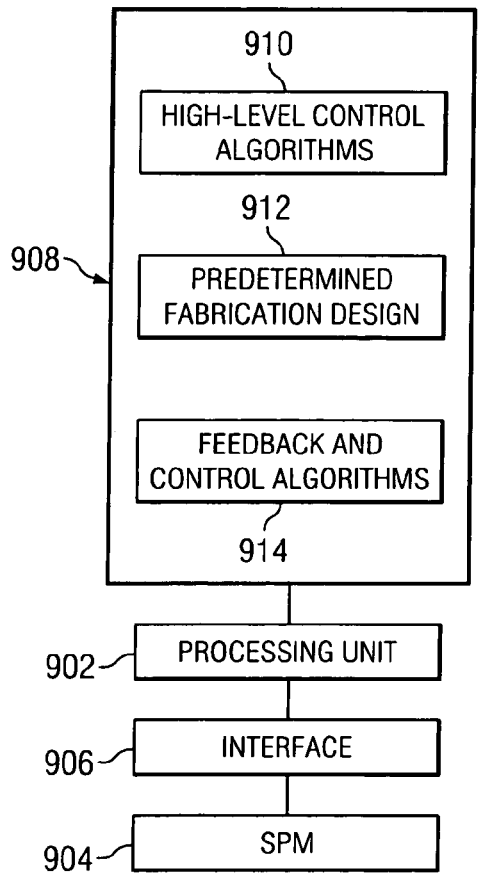

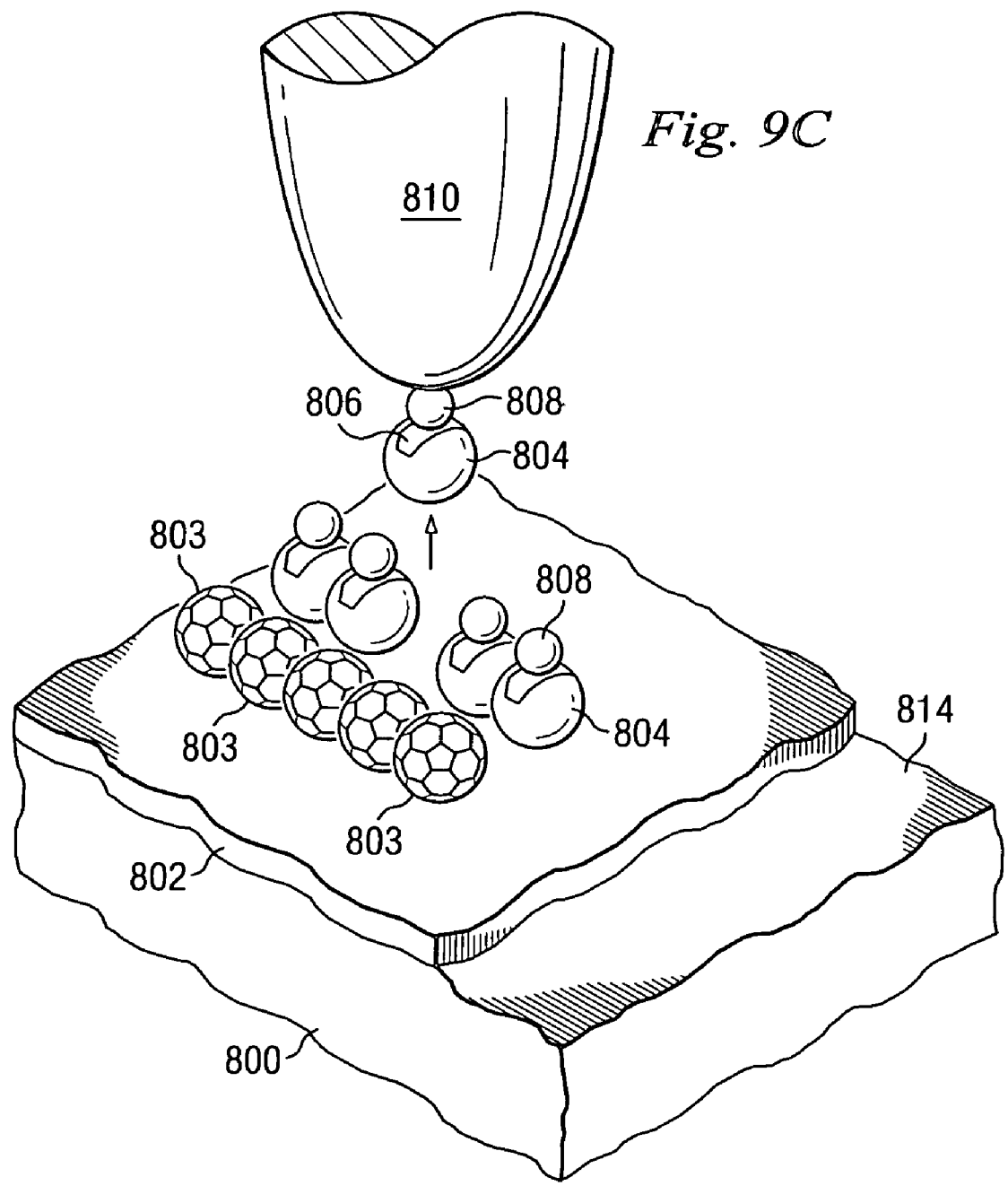

SYSTEMS AND METHOD FOR PICKING AND PLACING OF NANOSCALE OBJECTS UTILIZING DIFFERENCES IN CHEMICAL AND PHYSICAL BINDING FORCES

TECHNICAL FIELD

The present application is related to manipulation of individual nanoscale objects, such as atoms, molecules and nanoparticles, and more particularly, to systems and methods for positioning nanoscale objects using scanning probe microscopy. The positioning methods utilize differences in chemical and physical binding forces.

BACKGROUND OF THE INVENTION

During the last decade, the field of scanning probe microscopy and scanning probe microscopes has grown. A scanning probe microscope (SPM) employs a sharp probe that is brought into proximity (often an atomic distance) to a sample surface, and scanned over a specified area of the sample surface. Through a variety of imaging mechanisms, the probe measures some property of the sample (most commonly topography) with very high spatial resolution. Many variations on the proximity probe theme have been engineered, allowing investigation of mechanical, electronic, magnetic, and optical properties of sample surfaces with spatial resolution in the atomic to few nanometer range in three dimensions.

In a typical use, the tip of the probe of an SPM is brought into close proximity (typically a few Angstroms) with the surface of a sample, until a sensing device detects a desired local interaction between the probe tip and the sample surface. The probe tip is scanned across the sample surface, while keeping the interaction strength between them constant by means of a feedback loop. Such scanning of the probe tip generates a contour map of constant probe—sample interaction strength. The contour map can typically be displayed on a monitor screen.

The most commonly utilized localized interactions between a probe tip and a surface being scanned are electron tunneling, van der Waals and atomic repulsive forces. SPMs that utilize electron tunneling include the scanning tunneling microscope, referred to as an "STM". SPMs that utilize van der Waals and atomic repulsive forces include the atomic force microscope, referred to as an "AFM". In both STM and AFM, the resulting contour map reveals detailed surface structure, in some cases with atomic scale resolution. This high resolution mandates mechanically stiff construction and high accuracy probe positioning capabilities which are typically achieved by a control computer and a positioner/scanner.

Other examples of SPMs include near-field scanning optical microscopes (NSOM), scanning tunneling optical microscopes (STOM), near-field scanning acoustical microscopes (NSAM), scanning capacitance microscopes (SCM), and scanning electrochemistry microscopes (SECM).

Researchers have discovered that an STM may be used to manipulate atomic structures. As discussed by D. M. Eigler & E. K. Schweizer in "*Positioning single atoms with a scanning tunneling microscope,*" Letters to Nature, Vol. 344, pp. 524–526 (Apr. 5, 1990), and U.S. Pat. No. 4,987,312 to Eigler, an STM may be utilized to position individual xenon atoms on a single-crystal nickel surface. By controlling tip-sample distances, it is possible to translate a xenon atom to a desired location via attractive forces between the STM tip and the xenon atom. Specifically, the translating process begins by locating a xenon atom deposited on the nickel surface by imaging the nickel surface in a non-perturbative imaging mode. The STM tip is then positioned directly above the xenon atom. The STM tip is lowered toward the atom by changing the tunneling current to a higher level, thus increasing the attractive interaction between the xenon atom and the STM tip. The STM tip is moved to the desired destination, thereby dragging the xenon atom with it. The STM tip is withdrawn by decreasing the tunneling current to the value used for imaging and the xenon atom remains placed approximately at the destination location. Corrugations in the surface potential of the nickel surface cause the xenon atoms to remain approximately at the desired destination position after removal of the STM tip.

Other researchers have explored the potential of using an STM to perform nano-fabrication. For example, H. Tang et al. describe positioning $C_{60}$ molecules on a copper surface in "*Fundamental considerations in the manipulations of a single $C_{60}$ molecule on a surface with an STM,*" Surface Science Vol. 386, pp. 115–123 (1997). In their article, the desired positioning of the $C_{60}$ molecule is stabilized by an atomic step edge or a defect site on the copper surface. These researchers also analyzed several modes of manipulation, including a sliding mode, a pulling mode, and a pushing mode.

Other kinds of SPMs such as AFMs have been used to reposition and manipulate nanoscale objects. Baur et al. describe the manipulation of nanoparticles by means of repulsive forces exerted by the tip of an AFM on the nanoparticle to be manipulated. Baur et. al., *Nanoparticle Manipulation by Mechanical Pushing: Underlying Phenomena and Real-Time Monitoring*, Nanotechnology Vol 9, pp. 360–364 (1998).

Other SPM techniques have been developed to remove a nanoscale object from a surface and to place the object elsewhere on the surface instead of merely translating the particle over the surface. For example, one such SPM technique involves using an STM, and creating a sufficient attractive force between the STM tip and the nanoscale object to overcome binding forces between the object and the surface, and also to weakly bond the object to the STM tip. For example, application of a relatively high voltage to the STM tip may be utilized to induce an electric dipole in a given molecule to transfer the molecule to the STM tip. The molecule may then be repositioned to the desired location. The molecule is released by decreasing the voltage or by reversing the polarity of the voltage. See e.g., Huang et al., *Deposition and Subsequent Removal of Single Si atoms on the Si(111)-7×7 Surface by a Scanning Tunneling Microscope*, J. Vac. Sci. Technol. B 12(4), July/August 1994, pp. 2429–2433. Such STM techniques typically operate under extreme conditions (e.g., low temperature or high fields). Other SPM methods currently used for vertical manipulation (e.g., picking and placing) of molecules also require the use of voltage pulses, which generate very high fields.

In addition to the preceding techniques, Michelsen et al. have suggested that a molecule may be manipulated utilizing chemical driving forces between the molecule, the instrument manipulating the molecule, and the substrate involved. Michelsen et al., *Assembler Construction by Proximal Probe*, Fifth Foresight Conference on Molecular Nanotechnology, Nov. 5–8, 1997. Michelsen et al. suggested the transfer of silicon atoms from a gold "island" sputtered on a clean silicon (Si(100)-2×1) substrate to a clean area of the silicon surface where gold was not sputtered. The silicon atom is transferred from the gold island on the silicon surface to a clean area of the silicon surface by vertical manipulation with a tungsten SPM tip. Michelsen suggests that the chemical driving forces in the transfer of a silicon atom from the gold island to the tungsten tip, and then from the tungsten tip to the silicon substrate provide conditions where the silicon atom has less than 10 kcal/mol vibrational energy at each transfer point. However, Michelsen fails to recognize that when the silicon atoms are deposited onto the Si(100)-2×1 substrate having the gold islands sputtered thereon, the silicon atoms carry excess energy and therefore can easily migrate from inert areas, namely the gold islands, to highly reactive areas, namely the clean silicon substrate. The inert and reactive areas according to Michelsen are adjacent to each other during deposition of the atoms, thus, surface diffusion of the silicon atoms from the inert areas to the highly reactive sites is exacerbated. A significant number of molecules can selectively adsorb on these reactive areas, thereby precluding control over the placing of the molecules.

Although the preceding techniques related to manipulation of atoms and molecules represent significant technical accomplishments, the techniques still have substantial shortcomings. In particular, application of the techniques to nanoscale objects is extremely limited. Furthermore, many of the techniques are only operable under extreme conditions (e.g., very low temperatures or high fields), and many molecules cannot be repositioned with such techniques because the high electric fields, the high density tunneling current and other extreme conditions of such techniques would destroy the molecules. Further still, the stability of the atoms or molecules placed according to the preceding techniques is limited, as relatively minor forces may displace the particles in many cases. And finally, many nanoscale objects carry excess kinetic energy when they impinge on a surface during deposition, and therefore can easily migrate from the deposition site on the surface to a reactive area on the surface. The object will form a strong bond at the reactive area, thus permanently attaching the object to the surface at the wrong location. Therefore, it is not possible to create patterned surfaces with adjacent passive and reactive areas prior to the deposition process.

The present embodiments described below avoid these problems and are suitable for the fabrication of atomically precise patterns and structures.

BRIEF SUMMARY OF THE INVENTION

According to embodiments described herein, systems and methods for the manipulation of nanoscale objects comprise utilizing a scanning probe microscope (SPM) to manipulate the objects.

Methods according to the present embodiments comprise depositing a plurality of nanoscale objects onto a passive surface of a substrate; forming one or more target positions by causing the tip of an SPM to act upon one or more portions of the passive surface where a nanoscale object was not deposited; forming a bond between at least one of the plurality of nanoscale objects and the tip of the SPM; moving the SPM tip with the nanoscale object bonded thereto to the target position; forming a bond between the nanoscale object and the target position; and breaking the bond between the SPM tip and the nanoscale object. Such actions by the SPM tip that form the target position(s) include locally removing a portion of the passive surface or activating a portion of the passive surface.

Systems according to the present embodiments comprise providing a substrate with a passive surface, and providing an SPM operable to act upon the passive surface.

The passive surface according to the systems and methods of the present embodiments can be inherently passive, or can be made passive (i.e., "passivated") by the formation of a passive layer on the surface of the substrate. Whether inherent or made, the material comprising the passive surface is selected such that nanoscale objects deposited thereon only weakly bind to the passive surface and such that the passive surface can be acted upon by the tip of an SPM to form one or more target position(s). Such actions by the SPM include locally removing a portion of the passive surface or activating a portion of the passive surface. The material of the SPM tip is selected to exhibit an intermediate bond strength with a nanoscale object deposited on the passive surface. According to one embodiment, the system comprises an STM with a metal tip, a silicon substrate with a passive surface formed thereon comprising a hydrogen-terminated layer, and $C_{60}$ molecules as the nanoscale objects.

Systems and methods according to the present embodiments provide several advantages. First, the present embodiments do not require extreme conditions, rather the systems and methods disclosed herein are operable at room temperature and exposure of the nanoscale objects to relatively high electrical fields is not required. Second, systems and methods according to the present embodiments do not require a static or induced dipole in the nanoscale object to be placed. Accordingly, many nanoscale objects that cannot be picked up and placed by the methods of the prior art can be placed according to the systems and methods of the present embodiments. While the present embodiments are operable with extreme conditions, such as low temperature, and with static or induced dipoles in the nanoscale object, the present embodiments are fully operable without such conditions or dipoles, unlike the prior art. Third, the bonding of a nanoscale object to a target position is relatively strong according to the present embodiments. Bonding a nanoscale object to a highly reactive surface at the target position provides much greater stability than utilizing other known stabilization states such as corrugations in surface potential, atomic step edges, or a defect site. Accordingly, structures fabricated according to the present embodiments possess sufficient stability that the structures may be utilized in practical applications (e.g., nano- or micro-electro-mechanical systems and nano- or micro-electronic devices). Fourth, by selectively acting on the surface at target positions according to the present embodiments, the positioning of the molecules is not dependent on a pre-existing surface characteristic such as a defect site. Fifth, providing a passive surface during the deposition of the nanoscale objects avoids interference by the kinetic energy associated with the impinging nanoscale objects during deposition on the surface. After deposition, the nanoscale objects rapidly lose excess energy due to thermalization, which makes them less likely to undergo surface diffusion. Sixth, according to the present embodiments, the sample surface stays passive most of the time and is much less prone to contamination from impurities in the environment.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1 is a flowchart illustrating steps of a preferred embodiment of a method for picking and placing a nanoscale object using differences in chemical and physical binding forces;

FIG. 9C is a perspective view of the surface of FIG. 9B, where a reactive nanoscale object has been picked up by an SPM tip.

FIG. 10 is a block diagram illustrating a system for autonomously manipulating nanoscale objects according to the present embodiments.

DETAILED DESCRIPTION OF THE INVENTION

Figure 2:
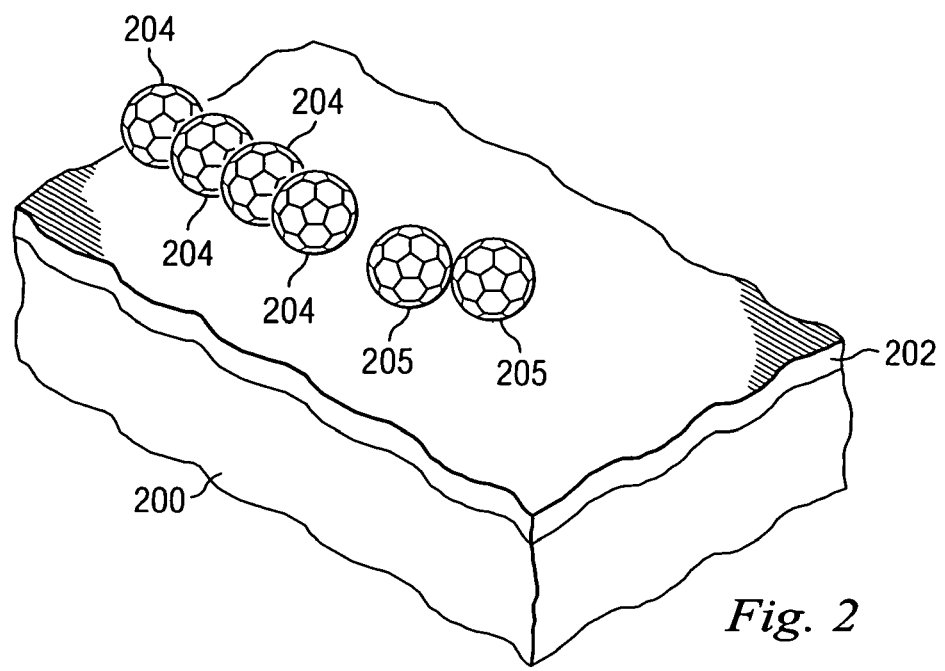
FIG. 2 is a perspective view of a passive surface with nanoscale objects deposited thereon according to the present embodiments.

The term "nanoscale object" as used herein refers to atoms, molecules (including macromolecule and dendrimers), nanoparticles (including colloids and clusters), biological objects of sub-micron dimensions (viruses, phages), sub-micron devices, device components and other fabricated structures of sub-micron dimension.

The term "chemical and physical binding force" refers to attractive interactions between nanoscale objects or between a nanoscale and a macroscale object. Chemical binding forces can lead to bond formation such as covalent, ionic and metallic bonds. Physical binding forces include van der Waals, capillary, adhesion, electrostatic and magnetic forces. Chemical binding forces generally form stronger bonds than physical binding forces. According to the present embodiments, chemical and physical binding forces comprise those interactions between a plurality of nanoscale objects, a substrate, a substrate surface, and the tip of an SPM.

FIG. 1 depicts flowchart 400 that sets forth a process flow for manipulating a nanoscale object or nanoscale objects according to the present embodiments. In step 401 of flowchart 400, the fabrication process begins by passivating the surface of a suitable sample substrate. Passivation of a substrate surface makes the substrate surface unreactive with respect to a nanoscale object deposited thereon. In particular, physical binding interactions between the nanoscale object deposited on the substrate surface and the substrate surface are weak, such as van der Waals interactions. By way of example, a suitable substrate comprises a clean silicon surface, and passivation of the clean silicon surface is accomplished by dosing the clean silicon surface with hydrogen atoms. The dosed silicon surface is referred to as a hydrogen-terminated surface. An exemplary method for dosing a silicon surface with hydrogen atoms is described by Lyding et al. in *Nanoscale Patterning and Oxidation of H-passivated Si(100)-2×1 Surfaces with Ultrahigh Vacuum Scanning Tunneling Microscope*, Appl. Phys. Lett. 64 (15), 11 Apr. 1994, pp. 2011–2012, the entire disclosure of which is incorporated herein by reference. Other methods for passivation of a suitable substrate surface are known to those of ordinary skill in the art, such as etching with hydrofluoric acid as described by G. S. Higashi et al. Appl. Phys. Lett. 56 (7), 12 Feb. 1990, pp. 665–658), the entire disclosure of which is incorporated herein by reference. Suitable substrates that can be passivated include but are not limited to silicon, diamond, and noble metal surfaces. Diamond and noble metal surfaces are surprisingly reactive with, for example, sulfur and can be passivated with Alkanethiol monolayer films deposited thereon.

According to another embodiment, the substrate surface comprises a native passive layer. By "native" passive layer, it is meant that the passive layer forms on the substrate unassisted, such as the oxide layer that forms on any oxide-free silicon wafer when it is exposed to air. According to yet another embodiment, the substrate surface comprises an inherently passive surface, if it can be activated by means of an SPM. By "inherently passive", is meant that the material forming the surface is inherently passive, such as graphite and mica. Portions of such an inherently passive surface could be activated by breaking bonds within the surface using the tip of an SPM, particularly, an STM. The resulting dangling bonds form highly reactive sites, which serve as target positions according to the present embodiments.

Accordingly, any passive layer which can be acted on with the tip of an SPM to form one or more target positions is suitable for the embodiments described herein. As used herein, the term "passive" means that the relative reactivity between a nanoscale object and the surface or layer referred to as "passive" is less than that between the nanoscale object and the tip of an SPM. For example, the reactivity between the nanoscale object and the passive surface could be described as "weak", and consisting of physical binding forces such as van der Waals forces, while the reactivity between the nanoscale object and the SPM tip could be described as "intermediate", and consisting of physical and chemical binding forces such as van der Waals forces and a charge transfer.

As used herein, the terms "passive layer", "passive surface", "passivated layer" or "passivated surface" means any layer or surface that is inherently passive, natively passive, or made passive by methods either known or described herein. In any embodiment, defects and other sites with higher reactivity can be tolerated if sufficient passive surface area remains, and in some cases, sites with higher reactivity are created intentionally, e.g., to obtain nucleation centers.

In step 402 of flowchart 400, nanoscale objects are deposited on the passive substrate surface. Suitable processes for the deposition of the nanoscale objects include, but are not limited to: thermal evaporation, physical vapor deposition, chemical vapor deposition, liquid phase deposition processes, and application of solutions or suspensions containing the nanoscale objects. The foregoing processes, as well as other processes for deposition, are known to those of ordinary skill in the art, and therefore will not be described in further detail herein.

FIG. 2 illustrates a substrate 200 comprising a passive surface 202 with a plurality of nanoscale objects 204 deposited thereon according to the present embodiments. Depending on the type of substrate and the type of nanoscale objects deposited thereon, islands of nanoscale objects, which can be multiple layers high, may be formed on the substrate surface. Environmental conditions in which the present embodiments are practiced, such as temperature and pH (in the case of liquid phase deposition) can be controlled and/or chosen to promote the formation of the intended arrangement of nanoscale objects on the passive substrate surface and at the target positions. For example, lowering the temperature of the substrate surface will freeze surface diffusion of weakly bonded nanoscale objects on the surface. This practice is known to those of ordinary skill in the art. Another example of manipulation of an environmental condition in the case of systems operating in a liquid environment is adjustment of the pH value. Adjusting the pH value will change surface charges, and the resulting forces can be used to support the vertical manipulation of nanoscale objects. Other environmental conditions that can be adjusted to promote formation of the intended arrangement of nanoscale objects on the passive substrate surface and at the target positions include electric field, magnetic field, vacuum, gas species and nature of any solvents used.

According to one embodiment, the nanoscale objects 204 comprise fullerene molecules, which are relatively large (7–15 Angstroms) cage molecules of carbon. According to another embodiment, the nanoscale objects comprise one or more fullerenes selected from the group consisting of $C_{60}$ (also referred to as a "buckyball"), $C_{70}$, $C_{76}$, and $C_{84}$.

When the nanoscale objects 204 are deposited onto the passive surface 202, they are weakly bonded to the surface by physical binding forces. According to one embodiment, the nanoscale objects 204 comprise fullerene molecules, the substrate surface 202 comprises hydrogen-terminated silicon, and the fullerene molecules bond to the substrate surface by way of van der Waals forces between the fullerene molecules and the hydrogen atoms.

Figure 2A:
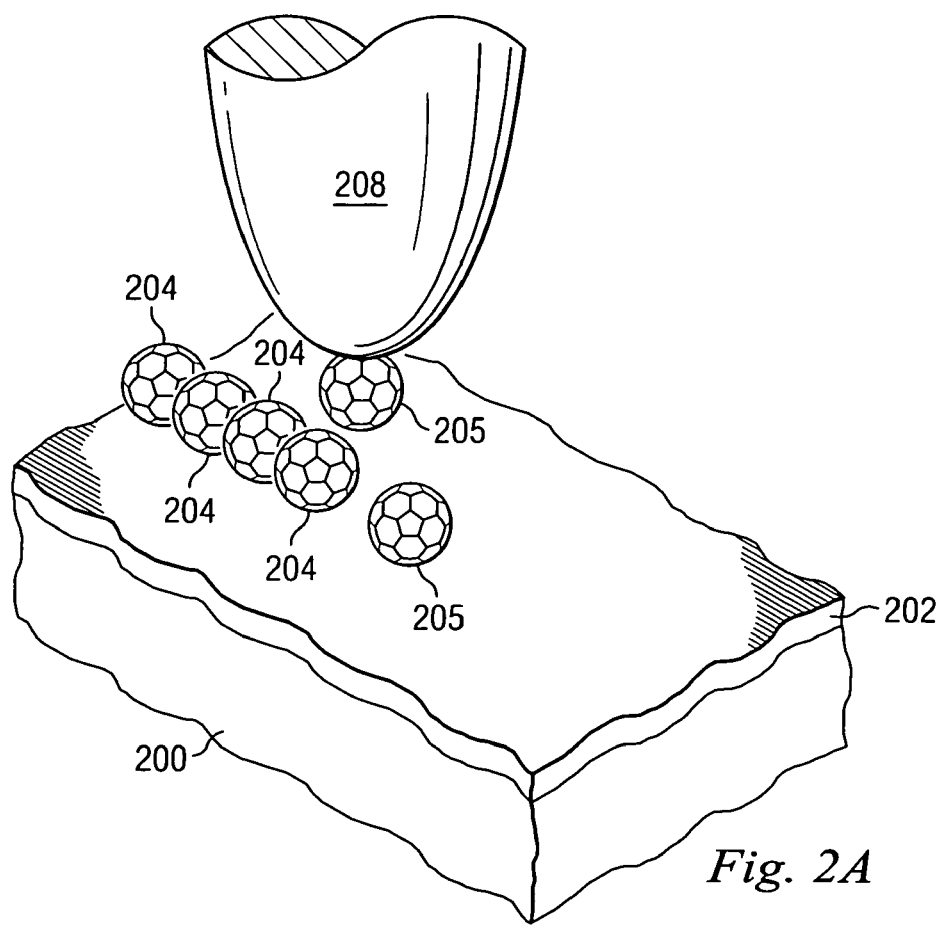
FIG. 2A is a perspective view of the surface of FIG. 2, illustrating lateral movement of nanoscale objects.

In subsequent steps that are discussed further herein, one or more target positions 206 is formed on the substrate surface 202. During deposition of the nanoscale objects on the substrate surface however, nanoscale objects could be deposited at the site on the substrate surface where a target position is to be formed. In such instance, and as illustrated in FIG. 2, one or more nanoscale objects 205 will need to be cleared from the site intended for the formation of a target position. Thus, in optional step 403, and as illustrated in FIG. 2A, one or more nanoscale objects 205 are moved laterally on the substrate surface 200 to clear the site at which a target position will be formed. Multiple methods for lateral manipulation of nanoscale objects are known in the art, and include but are not limited to the translation, push, pull, and slide methods disclosed in the art such as Eigler and Tang, each of which is discussed above.

Figure 3:
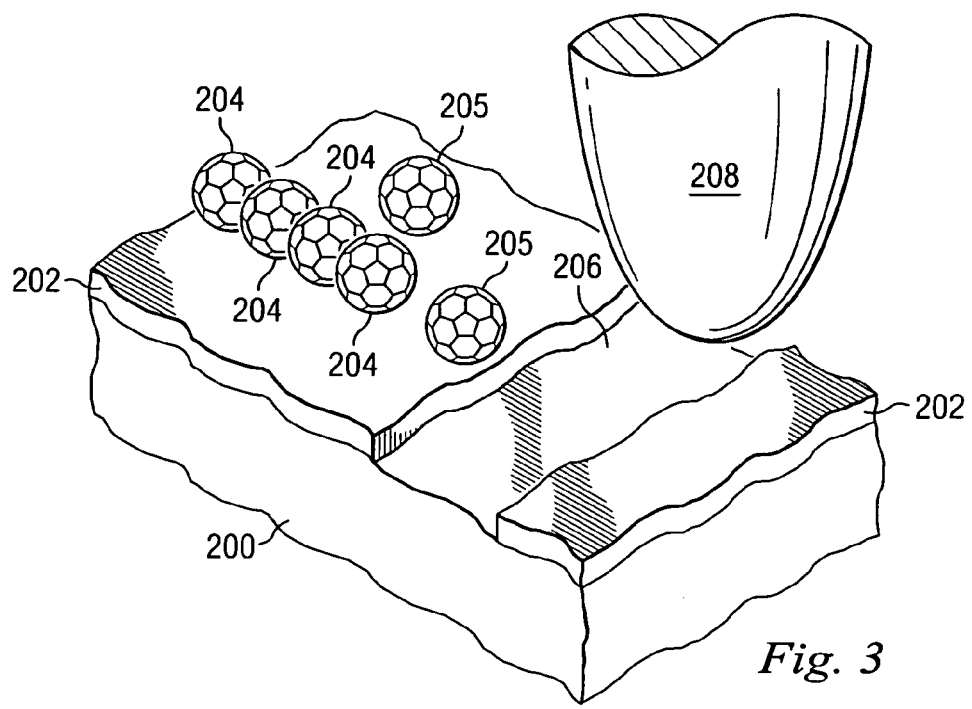
FIG. 3 is a perspective view of the surface of FIG. 2A, with a de-passivated target position.

Referring now to step 404, as illustrated by FIG. 3, one or more target positions 206 are formed on a selected portion or portions of the passive surface 202 by action of an SPM tip 208. The target positions 206 formed by the SPM tip 208 are those locations on the substrate surface 202 to which the deposited nanoscale objects 204 are to be repositioned. The action by the SPM tip 208 that forms the target position 206 can be one of removing a portion of the passive surface or activating a portion of the passive surface.

According to an embodiment where the SPM tip 208 activates a portion of the passive surface 202, the passive surface is an inherently passive surface. According to one embodiment, the SPM is an AFM, and the tip of the AFM is used to locally oxidize the surface of a passivated silicon surface. Further chemical processing is used to make these oxidized sites reactive for a colloid. An exemplary method for activating an inherently passive surface is described by Zheng et al., *Nanopatterned Assembling of Colloidal Gold Nanoparticles on Silicon*, Langmuir 16, pp 4409–4412, the entire disclosure of which is incorporated herein by reference.

In accordance with one embodiment where the SPM tip 208 removes a portion of the passive surface 202, the substrate 200 comprises silicon and the passive substrate surface 202 comprises a hydrogen layer, which is referred to by those of ordinary skill in the art as "hydrogen-terminated silicon". An SPM tip 208 forms a target position 206 by operating the SPM to position the SPM tip 208 at the target site, and increasing the tunneling current, so as to remove a hydrogen atom or atom(s) from the target site. This action is referred to as "de-passivation" or "de-passivating". A suitable method for removing a portion of a passive surface that can be used with the present embodiments is disclosed in *Hydrogen Atom Extraction and Redeposition on Hydrogen-Terminated Silicon Surface with Scanning Tunneling Microscope at Room Temperature*, D. H. Huang and Y. Yamamoto, Scanning Microscopy 10 (3), pp. 717–726 (September 1996), the entire disclosure of which is incorporated herein by reference. Another suitable method for removing a portion of a passive surface that can be used with the present embodiments is disclosed by Lyding et al., *Nanoscale Patterning and Oxidation of H-passivated Si(100)-2×1 Surfaces with Ultrahigh Vacuum Scanning Tunneling Microscope*, Appl. Phys. Lett. 64 (15), 11 Apr. 1994, pp. 2011–2012, the entire disclosure of which is incorporated herein by reference.

According to a preferred embodiment of step 404 where the substrate surface 202 comprises a hydrogen-terminated silicon surface, a target position 206 is formed by extraction of the hydrogen covering the substrate 200 at the target position. The extraction of the hydrogen is achieved by scanning the STM tip 208 over the substrate surface 202 at the target position while applying a continuous bias of several volts. Alternatively, pulses of several volts can be applied between the STM tip 208 and the substrate surface 202 at the target position 206. According to one embodiment, the substrate surface 202 is positively biased, thus electrons will tunnel from the STM tip into the surface. The electrons tunneling into the surface cause excitation and bond breakage that results in the removal of the hydrogen at the target position. According to another embodiment, the substrate surface 202 is negatively biased, thus electrons will tunnel from the substrate surface 202 to the STM tip 208. The electrons tunneling out of the surface cause the hydrogen at the target position to undergo field evaporation as positive ions, thus resulting in the depassivation of the substrate surface at the target position.

Figure 3A:
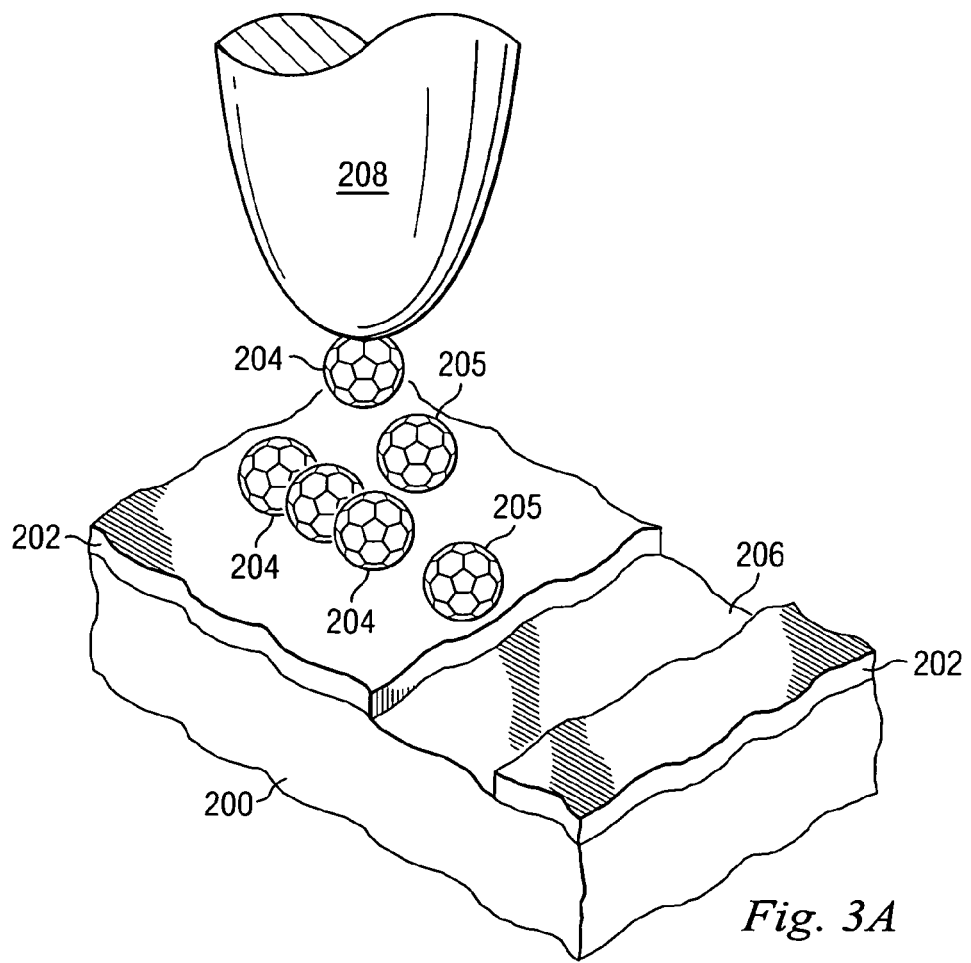
FIG. 3A is a perspective view of the surface of FIG. 3, illustrating lateral movement of nanoscale objects.

In optional step 405, and as illustrated in FIG. 3A, the nanoscale object 204 is moved laterally prior to being vertically moved (i.e., picked up and placed) to the target position 206. Multiple methods for lateral manipulation of nanoscale objects are known in the art, and include but are not limited to the translation, push, pull, and slide methods disclosed in the art such as Eigler and Tang, each of which is discussed above. The deposited nanoscale objects 204 can thus be laterally moved to sites that are more passive than the sites at which they are deposited. An exemplary event for which optional step 405 is implemented occurs when islands of nanoscale objects are formed during deposition. The islands form due to attractive interactions between the nanoscale objects. Moving a nanoscale object from an island onto a more passive area of the substrate surface (i.e., an area having less reactivity with the nanoscale object) reduces the degree of binding between the surface and the object. Other examples include, but are not limited to moving nanoscale objects away from defects in the passive layer on the substrate surface.

Figure 4:
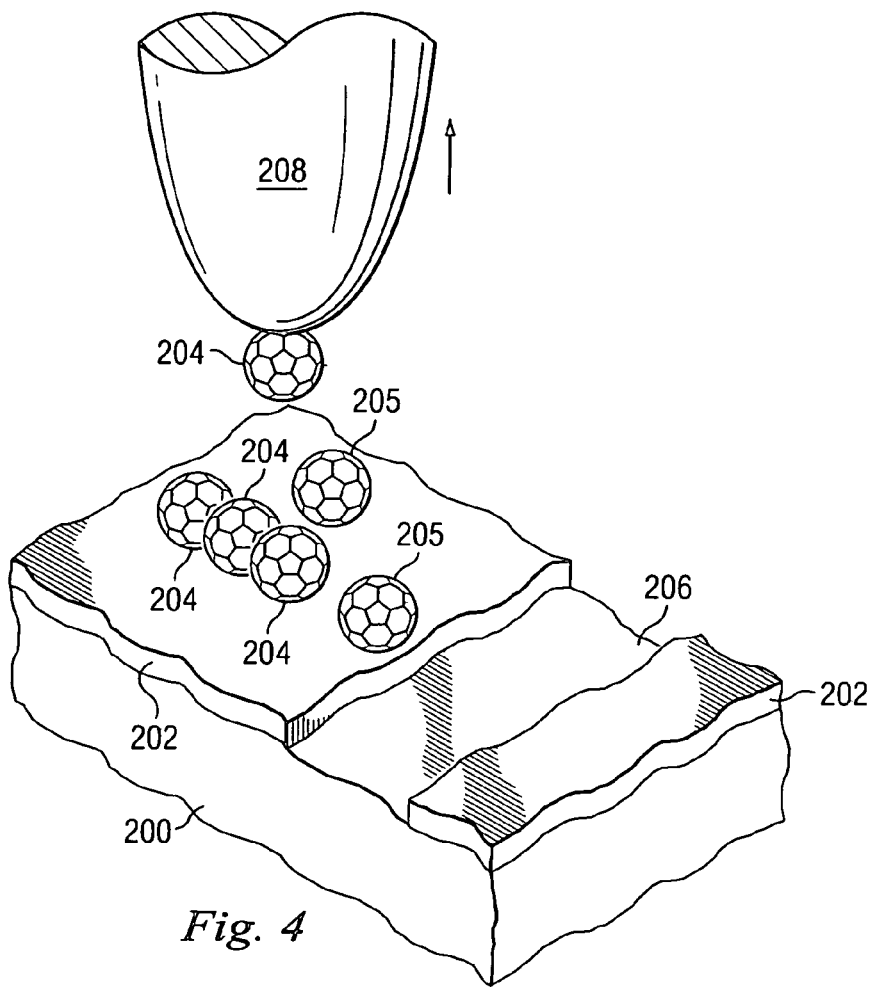
FIG. 4 is a perspective view of the surface of FIG. 3A, where a nanoscale object has been picked up by an SPM tip.

Referring now to step 406, according to one embodiment of step 406, the SPM tip is moved toward (such as by lowering) the substrate surface 202 to a proximity sufficient to form a bond between the nanoscale object and the SPM tip 208. In step 407 of flowchart 400, SPM tip 208 is retracted from the passive surface 202, effectively carrying the nanoscale object 204 bonded thereto along with it. As illustrated in FIG. 4, the nanoscale object 204 has in effect been picked up by the SPM tip 208. In a preferred embodiment, the retraction of the SPM tip 208 is achieved by setting the operational parameters of the SPM to values suitable for imaging of the substrate surface. According to other embodiments, the retraction of the SPM tip is achieved by setting the operational parameters of the SPM to values that are either too small or too large to obtain quality imaging of the substrate surface with the SPM.

According to one embodiment of step 406 and step 407, the nanoscale object is a $C_{60}$ molecule and the SPM is an STM. According to such embodiment, the tunneling voltage of the STM is decreased and the set point for the tunneling current is increased until the $C_{60}$ molecules are effectively pushed around when attempting to image the molecules.

The $C_{60}$ molecules are pushed around until a sudden event occurs, such as a spike in the tunneling current or the Z voltage applied to the tip. Such a spike indicates that a $C_{60}$ molecule was transferred to the STM tip. At the observance of the spike, the setpoint and tunneling voltage are quickly changed to the values used for imaging, and an image is acquired. If the $C_{60}$ molecule to be picked up is not found in the image, then it is deemed confirmed that the molecule has been transferred to the STM tip. If the $C_{60}$ molecule appears in the image, then another attempt to transfer the molecule to the tip is initiated by decreasing the voltage of the STM, increasing the set point for the tunneling current, and re-inititiaing the pushing of the $C_{60}$ molecules. The distances from the STM tip to the $C_{60}$ molecule during pushing and transferring to the tip are not readily ascertainable, however, it is ascertainable that the pushing of the $C_{60}$ molecules occurs at a distance that is a few Angstroms less than the distance at which imaging of the surface can occur.

As an alternative, confirmation that the $C_{60}$ molecule has been transferred to the STM tip can be obtained according to the imaging method disclosed by Heike et. al., *Nanoneedle formation on silicon* (111) *surface using a scanning tunneling microscope tip*, J. Appl. Phys. 80, 4182 (1996), the entire disclosure of which is incorporated herein by reference. According to the method disclosed by Heike et al., a nanoneedle is formed on the surface of a silicon wafer by applying a negative ramp voltage to the tip of an STM. The nanoneedle scans the STM tip, and the STM image is obtained as a convolution of the tip apex shape and the nanoneedle shape. The nanoneedle is smaller than the STM tip by at least one order of magnitude, thus the STM image obtained represents the tip apex structure, which indicates attachment of the molecule to the tip.

According to one embodiment of step 406 and step 407, the nanoscale object is a $C_{60}$ molecule, and the SPM is an STM operated at a bias below 1 Volt and a setpoint for the tunneling current that is increased from 150 pA to push the $C_{60}$ molecules until the aforementioned sudden event is observed. To confirm that the sudden event did in fact indicate transfer of the molecule to the STM tip, the bias is raised to 3 volts and the setpoint is lowered to 150 pA to obtain an image of the substrate surface. If the molecule to be picked up does not appear in the image, then transfer to the STM tip is confirmed. As discussed herein, the transfer of a nanoscale object to the tip of an SPM is accomplished by a bond that forms between the nanoscale object and the SPM tip.

The bond between the nanoscale object and the SPM tip forms as a result of physical and chemical binding forces, such as van der Waals and charge transfer. According to one embodiment, the SPM is comprised of a material that imparts binding properties to the SPM tip that result in the bond energy of this bond being larger than the bond energy between the nanoscale object and the passive surface. Because of the larger bond energy, the nanoscale object is bound more strongly to the SPM tip than it is to the passive surface. According to another embodiment, a layer is deposited on the SPM tip, or is formed on the SPM tip by means of a chemical reaction, in order to impart binding properties to the tip that result in the bond between the SPM tip and the nanoscale object being stronger than the bond between the nanoscale object and the passive surface.

Figure 5:
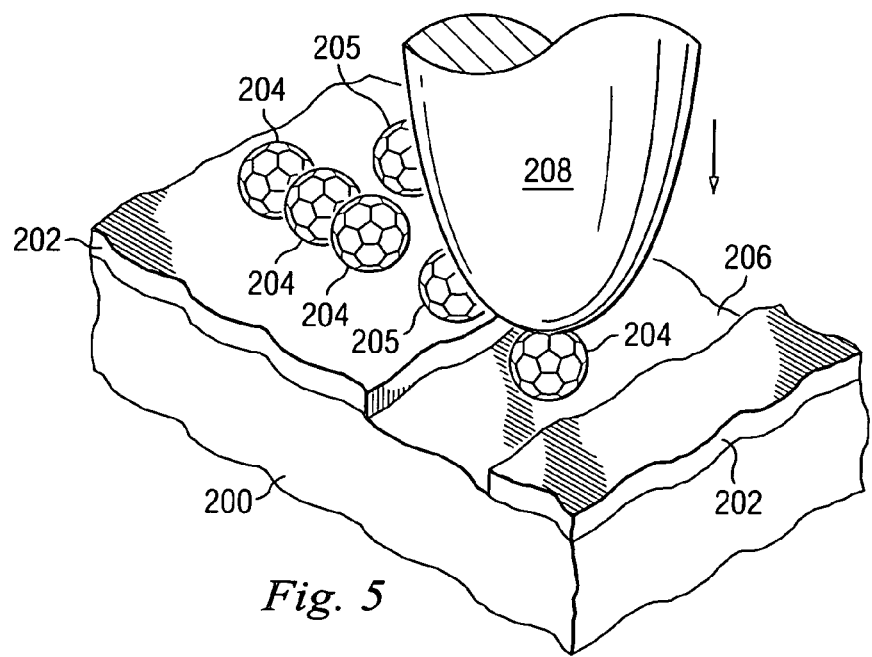
FIG. 5 is a perspective view of the surface of FIG. 4, where a nanoscale object has been repositioned to the de-passivated target position.

Referring now to step 408 of flowchart 400, the SPM is operated to move SPM tip 208, with the nanoscale object 204 bonded thereto, to a location above the target position 206. According to step 409, a bond is formed between nanoscale object 204 and the target position 206 by moving the SPM tip 208 toward the target position 206 to a proximity sufficient to cause a bond between the nanoscale object 204 and the target position 206 to form. Thus, the nanoscale object 204 is effectively placed at the target position 206, as illustrated in FIG. 5.

The bond formed between the substrate 200 present at the target position 206 and the nanoscale object 204 is stronger than the bond between the SPM tip 208 and the nanoscale object 204. According to one embodiment, the bond between the nanoscale object 204 and the target position 206 is a covalent bond. The material of the substrate 200 present at the target position 206 and the nanoscale object 204 are selected such that the bond between the target position 206 and the nanoscale object 204 will be stronger than the bond between the nanoscale object 204 and the SPM tip 208. The larger bond strength between the nanoscale object 204 and the substrate surface at the target position 206 has the additional benefit that the resulting structure has sufficient stability to be utilized as part of a functional device.

Figure 6:
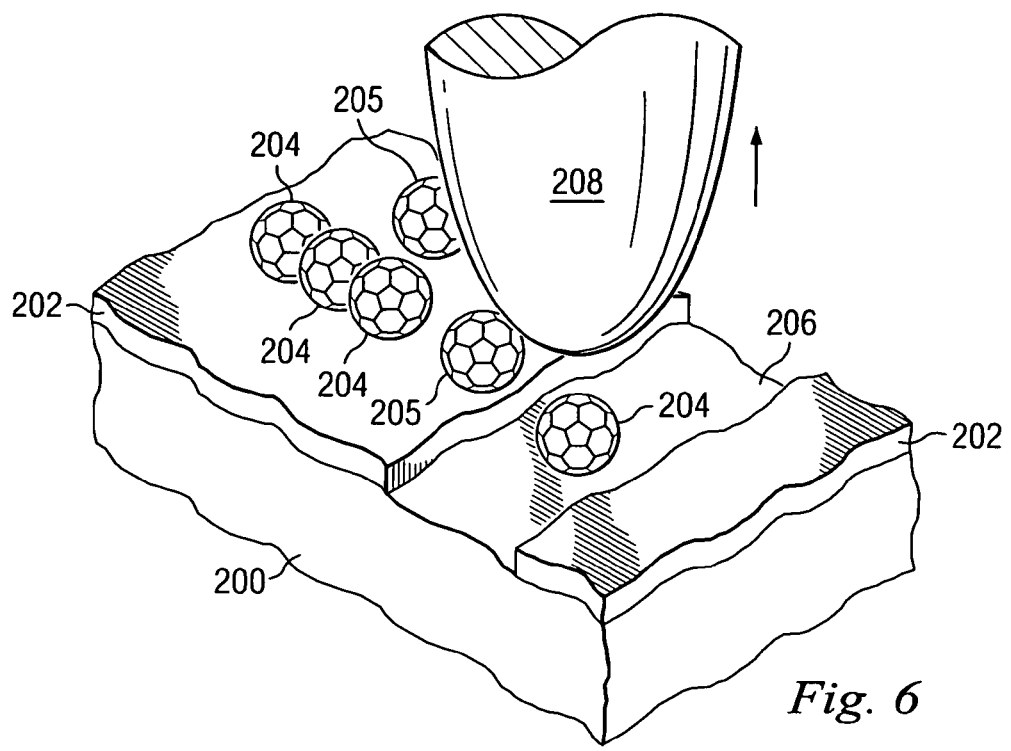
FIG. 6 is a perspective view of the surface of FIG. 5, where a nanoscale object has been placed at the de-passivated target position.

In step 410, and as illustrated in FIG. 6, the SPM tip 208 is retracted far enough from the nanoscale object to break the bond between the nanoscale object 204 and the SPM tip, thereby effectively releasing the nanoscale object 204 from tip 208, and leaving the nanoscale object 204 bonded to the target position 206. As the present embodiments use interatomic forces (e.g., van der Waals forces and some charge transfer) to form the bond between the nanoscale object 204 and the SPM tip 208, the release of the nanoscale object 204 from the SPM tip 208 is caused in large part by the distance the SPM tip 208 is retracted. Other forces, such as electric fields (or tunneling current if the SPM is an STM), may contribute to the release of the nanoscale object from the SPM tip. According to one embodiment of steps 409 and 410, the nanoscale object 204 being placed at the target position 206 is a $C_{60}$ molecule, and the SPM is an STM.

Figure 6A:
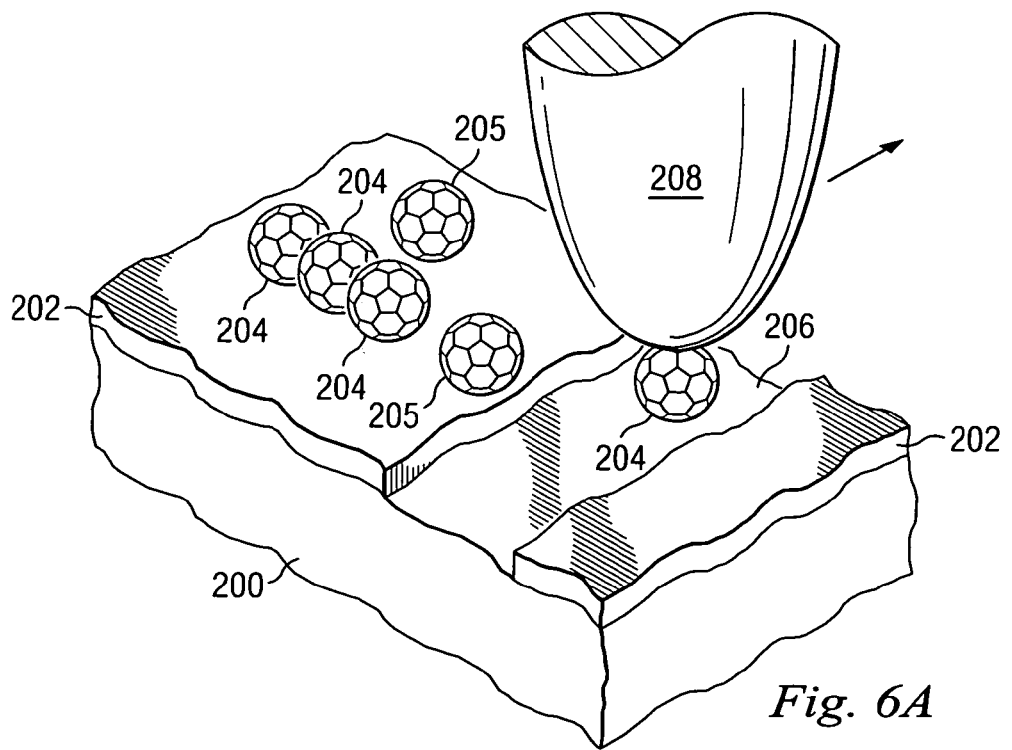
FIG. 6A is a perspective view of the surface of FIG. 6, illustrating lateral movement of nanoscale objects.

In optional step 411, and as illustrated in FIG. 6A, once the nanoscale object 204 has been placed at the target position 206, it can be laterally manipulated according to methods for lateral manipulation of nanoscale objects as discussed above with respect to optional steps 403 and 405. As discussed above, such methods for lateral manipulation are known in the art, and include but are not limited to the translation, push, pull, and slide methods disclosed in the art such as Eigler and Tang, each of which is discussed herein.

Referring now to step 412, it is determined whether the fabrication process has been completed. The determination at step 412 may be a very simple calculation (e.g., counting the number of nanoscale objects), or it may include more complex methods (e.g., SPM imaging) to verify the correctness of the obtained structure. If the determination at step 412 indicates that fabrication has not been completed, additional placement of nanoscale objects 204 may occur by returning to step 406, and optionally to step 405. If fabrication has been completed, then the process proceeds to step 413, where any desired post-processing activities can be performed, or if no further processing is desired, fabrication is ended.

Figure 7:
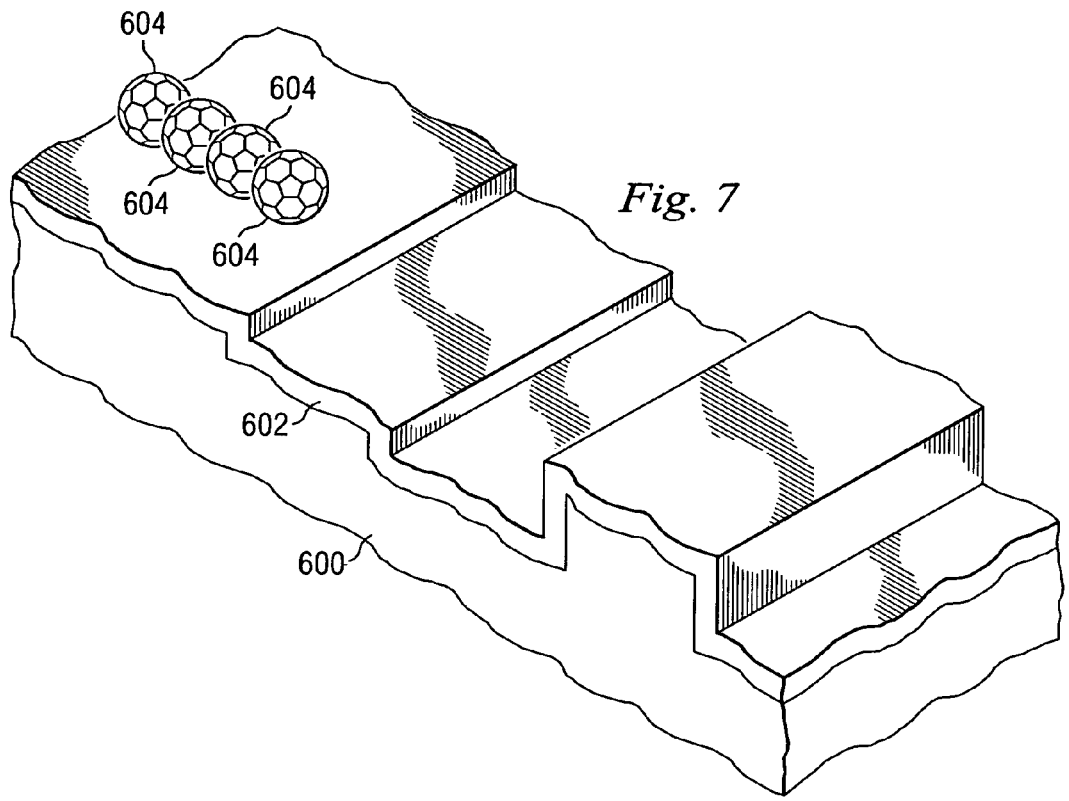
FIG. 7 is an elevation view of a multiple-plane passive surface with nanoscale objects deposited thereon according to embodiments of the present invention.

Although the present embodiments have been described as occurring on a passive substrate lying substantially in a single plane, the present embodiments are not so limited. Specifically, the present embodiments include picking and placing of nanoscale objects on non-planar surfaces and surfaces lying in more than one plane, for example, stepped surfaces, rough surfaces and surfaces with artificially created topography or structures. Referring now to FIG. 7, a substrate 600 having a passive surface lying in more than one plane, namely, stepped surface layer 602, is illustrated. Stepped surface layer 602 can be formed by fabrication methods known to those of ordinary skill in the art. Stepped surface layer 602 is passive as described above with respect to step 401 of the flowchart 400 illustrated by FIG. 1. A plurality of nanoscale objects 604 are deposited on stepped surface 602 and manipulated according to steps 403–413 illustrated by FIG. 1. Specifically, to manipulate nanoscale objects 604, operational parameters of an SPM are adjusted as described above with respect to steps 403–413 and FIGS. 2–6. It will be appreciated that the primary differences between manipulation of nanoscale objects as illustrated in FIGS. 2–6, and manipulation of nanoscale objects on a stepped surface embodiment as illustrated in FIG. 7 are the operational parameters for raising and lowering the SPM tip to form target positions on the stepped surface 602, and to pick up and place nanoscale objects 604.

According to another exemplary embodiment, manipulation of nanoscale objects and/or fabrication in three dimensions is enabled by utilizing bonding between the nanoscale objects being manipulated.

Figure 8A:
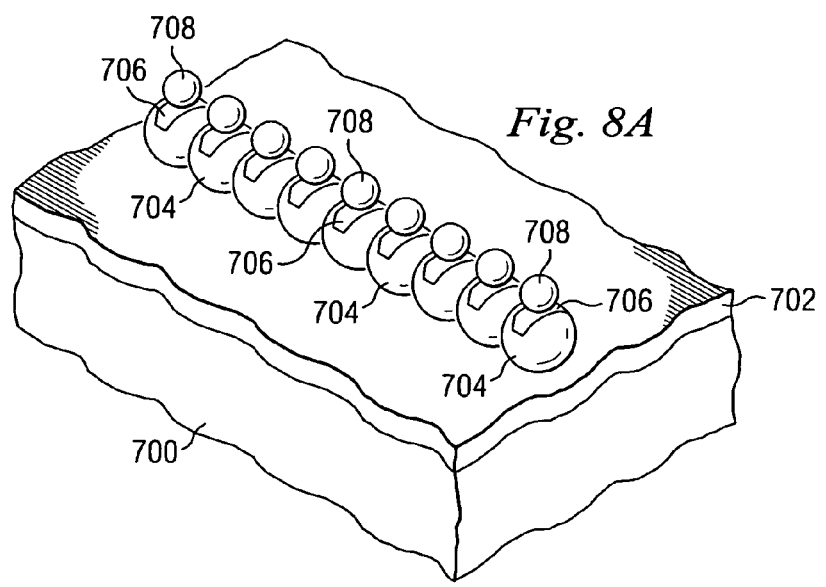
FIG. 8A is a perspective view of a passive surface with reactive nanoscale objects deposited thereon according to the present embodiments for manipulation of nanoscale objects in three dimensions.

Referring now to FIG. 8A, a plurality of reactive nanoscale objects 704 are deposited onto a passive surface 702 of a substrate 700 according to step 402 illustrated by the flowchart 400 of FIG. 1. As previously described, suitable processes for the deposition of the nanoscale objects 704 include, but are not limited to: thermal evaporation, physical vapor deposition, chemical vapor deposition, liquid phase deposition processes, and application of solutions or suspensions containing the nanoscale objects. Also as previously described, the passive surface 702 can be natively passive, inherently passive, or made passive.

Prior to deposition, reactive nanoscale objects 704 are formed that possess reactive sites 706. The reactive nanoscale objects 704 are formed by synthesizing the molecules with chemical functional groups at selected locations of the nanoscale object, which selected locations are then reactive sites 706. Methods for chemically functional nanoscale objects are known to those of ordinary skill in the art, and therefore will not be discussed in detail herein. Furthermore, the kind or type of chemical or functional group placed on the nanoscale object can be readily determined by those of ordinary skill in the art, based on the intended end use of a fabrication comprising such reactive nanoscale objects. Accordingly, methods for selecting the kind of group to place on the nanoscale object are not discussed in detail herein.

After reactive sites 706 have been formed on the nanoscale objects, a cap 708 is formed over each reactive site. Methods for forming such caps 708 over such reactive sites 706 are known to those of ordinary skill in the art, and therefore are not discussed in detail herein. By way of example, organic chemists use a variety of protective groups, i.e., caps, to prevent or delay reactions. Such caps could comprise a hydrogen or iodine atom, or a molecule. Generally, the material forming the cap can be removed from the reactive site when desired, and will cause the reactive nanoscale object to orient itself upon deposition on the substrate surface such that the cap faces away from the substrate surface, as illustrated in FIG. 8A.

The process for chemically functionalizing a nanoscale object to form reactive sites 706 and placing a cap 708 over the reactive sites 706 is described herein in a general and simplified manner. One of ordinary skill in the art would appreciate that multiple steps are often involved in the process, including but not limited to purification, catalytic reactions, and synthesis of intermediates.

Figure 8B:
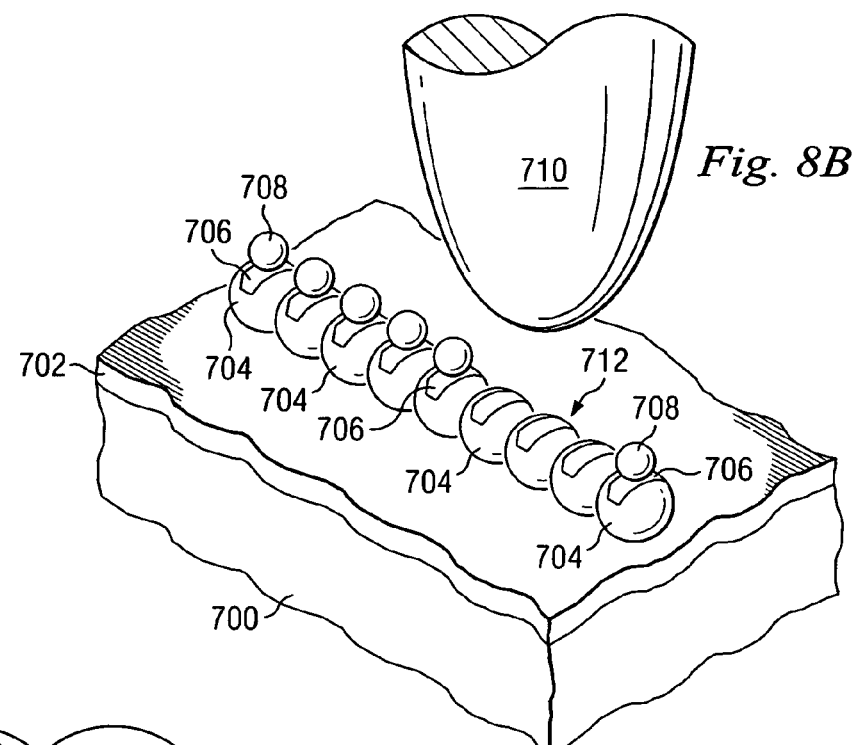
FIG. 8B is a perspective view of the surface of FIG. 8A, with at least one reactive site target position formed on at least one reactive nanoscale object.

According to the present embodiments, the protective cap 708 serves to passivate the reactive site 706 until the protective cap 708 has been acted upon by an SPM. Thus, according to one embodiment, and as illustrated in FIG. 8B, the tip 710 of an SPM is lowered into proximity with the reactive nanoscale objects 704 to form one or more reactive site target positions 712. In particular, the SPM tip 710 forms a reactive site target position 712 by removing the protective cap 708 to expose the reactive site 706.

Removal of the protective cap 708 by the SPM tip 710 can be accomplished with the same methods as described above with respect to step 404 of FIG. 1. In particular, an SPM tip 710 removes a protective cap 708 by being moved toward the protective cap 708 into a proximity close enough to remove it. According to a preferred embodiment, the protective cap 708 comprises a hydrogen atom, which is subsequently removed from the nanoscale object by action of the tip of an STM. Such action by the STM tip is achieved by applying a continuous bias of several volts. Alternatively, pulses of several volts can be applied between the STM tip and the protective cap 708. According to one embodiment, the protective cap 708 is positively biased, thus electrons will tunnel from the STM tip into the protective cap 708. The electrons tunneling into the protective cap 708 cause excitation and bond breakage that results in the removal of cap. According to another embodiment, the protective cap 708 is negatively biased, thus electrons will tunnel from the protective cap 708 to the STM tip. The electrons tunneling out of the protective cap 708 cause it to undergo field evaporation as a positive ion, thus resulting in its removal.

After formation of reactive target positions 712, a bond is formed between the SPM tip 710 and another of the reactive nanoscale objects 704. The bond between the SPM tip 710 and another of the reactive nanoscale objects 704 is formed according to step 406 as previously described. As discussed above with respect to step 406, preferably, a bond is formed between the SPM tip 710 and a reactive nanoscale object 704 by moving the SPM tip close enough to the substrate surface 702 such that the bond can form. The bond energy of the bond between the SPM tip 710 and the reactive nanoscale object 704 is larger than the bond energy between the reactive nanoscale object 704 and the passive surface 702. Because of the larger bond energy, the reactive nanoscale object 704 is bound more strongly to the SPM tip 710 than it is to the passive surface 702.

Figure 8C:
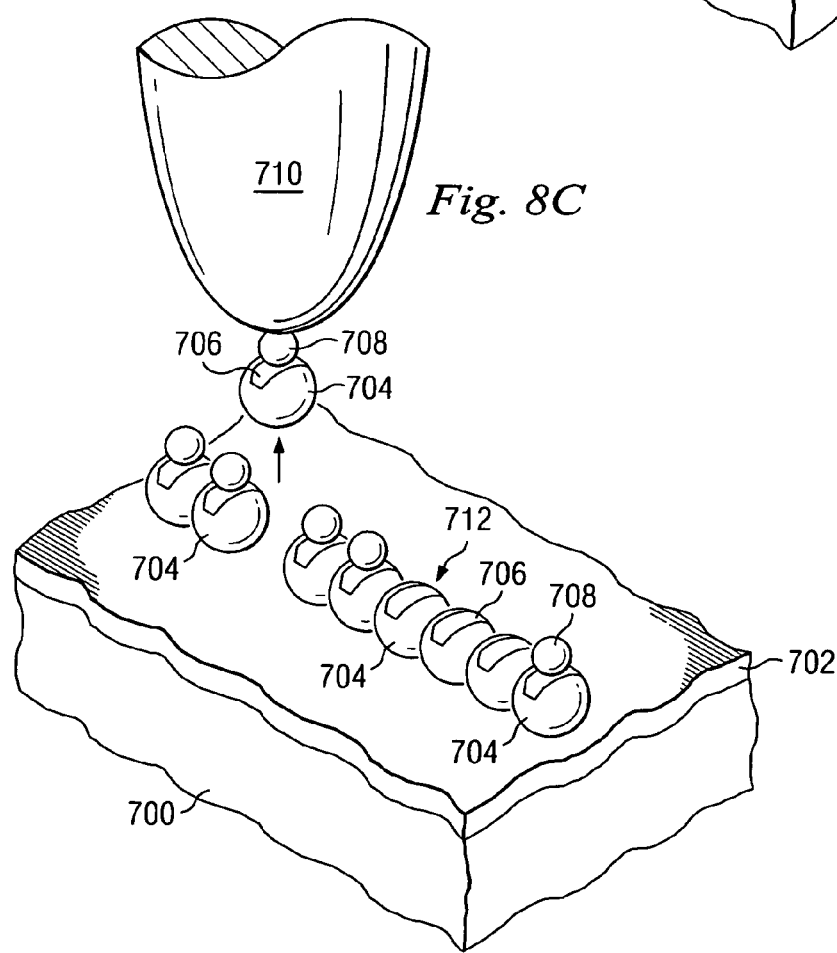
FIG. 8C is a perspective view of the surface of FIG. 8B, where a reactive nanoscale object has been picked up by an SPM tip.

With the reactive nanoscale object 704 bound to the SPM tip 710, the SPM tip 710 is then retracted from the passive surface 702, carrying the nanoscale object 704 bonded thereto along with it. The retraction of the SPM tip 710 is accomplished according to step 406 as previously discussed. Thus, as described above, in a preferred embodiment, the retraction of the SPM tip 710 is achieved by setting the operational parameters of the SPM to values suitable for imaging of the substrate surface. According to other embodiments, the retraction of the SPM tip is achieved by setting the operational parameters of the SPM to values that are either too small or too large to obtain quality imaging of the substrate surface with the SPM. Preferably, the SPM tip 710 is retracted a distance from the passive surface 702 sufficient to allow the SPM tip 710 to move to a position above one or more reactive target positions 712. As illustrated in FIG. 8C, when the SPM tip 710 is retracted, the reactive nanoscale object 704 is in effect picked up by the SPM tip 710.

Figure 8D:
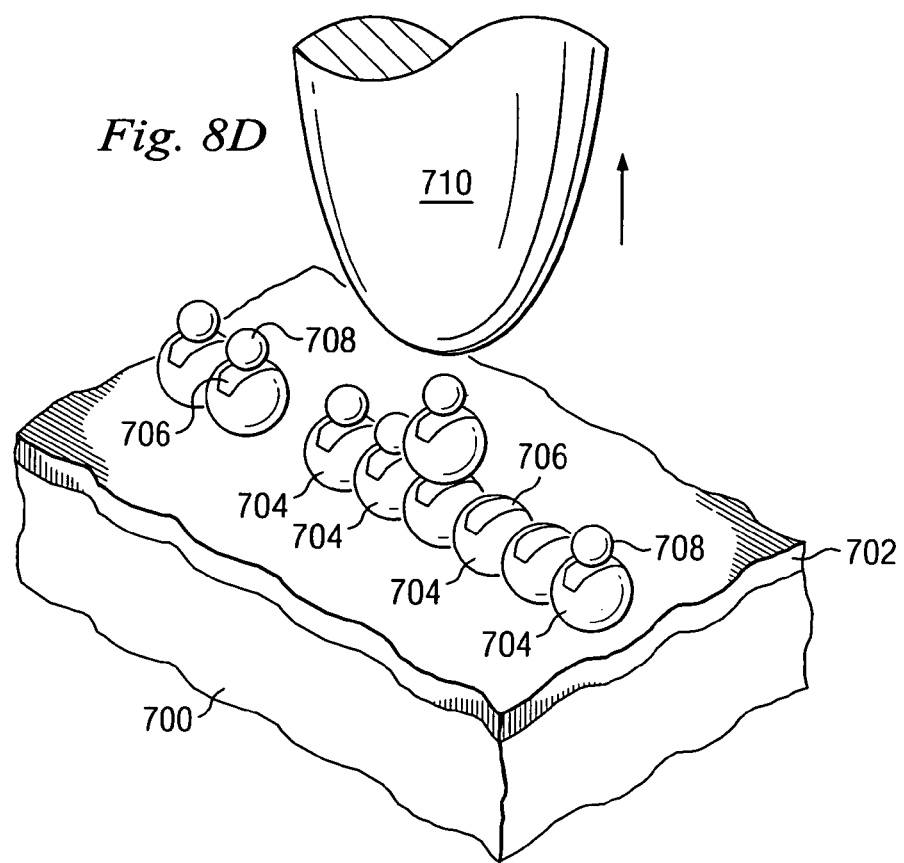
FIG. 8D is a perspective view of the surface of FIG. 8C, where a reactive nanoscale object has been placed at a reactive site target position.

Referring now to FIG. 8D, the placement of a reactive nanoscale object 704 bonded to the SPM tip 710 at a reactive site target position 712 is illustrated. As described with respect to step 408 of flowchart 400, the SPM is operated to move the SPM tip 710, with the reactive nanoscale object 704 bonded thereto, to a location above the reactive site target position 712. As described above with respect to step 409, a bond is then formed between reactive nanoscale object 704 and reactive site target position 712 by lowering SPM tip 710 close enough to the target position 712 such that a bond can form. Still referring to FIG. 8D, retraction of the SPM tip 710 in order to break the bond between the reactive nanoscale object 704 and the SPM tip, thereby effectively releasing the reactive nanoscale object 704 from SPM tip 710, is illustrated. The nanoscale object 704 remains positioned on the exposed reactive site 706 at a reactive site target position 712.

The placement of the reactive nanoscale object 704 at the reactive site target position 712, the formation of the bond between the reactive nanoscale object 704 and the reactive site target position, and the retraction of the SPM tip 710 to effectively release the nanoscale object 704 from the SPM tip 710 is accomplished according to steps 408 and 409 as discussed above. Thus, according to one embodiment, the reactive nanoscale object 704 being placed at the target position 712 is a functionalized fullerene molecule having a reactive site 706 and a cap 708, and the SPM is an STM.

According to one embodiment, the bond formed between the reactive site 706 present at the target position 712 and the nanoscale object 704 is a covalent bond, and is stronger than the bond between the SPM tip 710 and the nanoscale object 704. The group or groups forming the reactive site 706 and the material forming the nanoscale object 704 are selected such that the bond between the reactive site 706 present at the target position 712 and the nanoscale object 704 will be stronger than the bond between the SPM tip 710 and the nanoscale object 704.

Figure 8E:
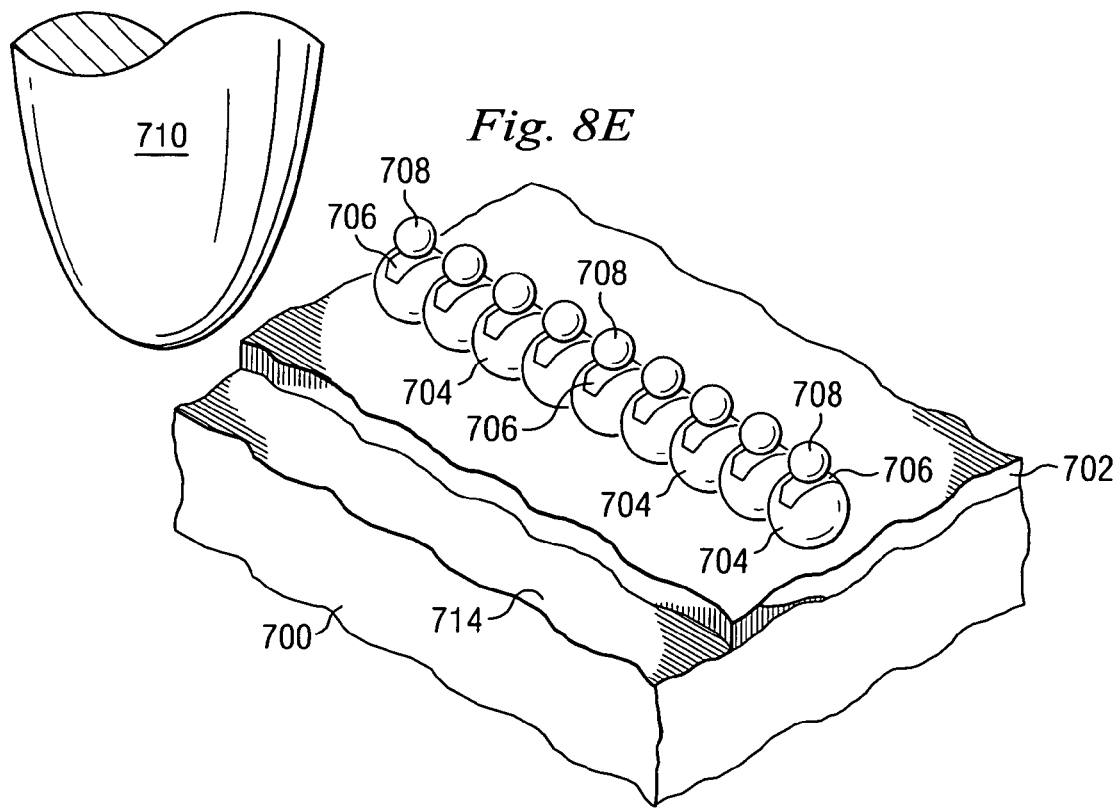
FIG. 8E is a perspective view of the surface of FIG. 8D, with a surface target position 714 formed thereon.

In addition to the formation of reactive site target positions 712 on the nanoscale objects 704, surface target positions can also be formed directly on the substrate surface 702 by the action of an SPM tip in the same manner as target positions 206 are formed as described above with respect to the embodiment illustrated in FIGS. 2–6. Referring now to the embodiment illustrated by FIG. 8E, a surface target position 714 has been formed on the substrate surface 702 by the action of SPM tip 710. Surface target position 714 is formed on the substrate surface in the same manner as described above with respect to step 404 of FIG. 1 as illustrated in FIG. 3. Accordingly, as discussed above with respect to step 404, one or more surface target positions 714 are formed on a selected portion or portions of the passive surface 702 by action of an SPM tip 710. The action by the SPM tip 710 that forms the surface target position can be one of removing a portion of the passive surface 702 or activating a portion of the passive surface 702. When the embodiment comprising formation of surface target positions 714 is used, the surface target positions 714 can be formed either before or after formation of reactive site target positions 712. The reactive nanoscale objects 704 can thus be repositioned to a surface target position 714, and can also be repositioned to reactive site target positions 712 formed by the removal of a protective cap 708.

According to one such embodiment, one or more surface target positions 714 is formed on the passive surface 702 by causing the SPM tip 710 to act upon one or more portions of the passive surface 702 where a reactive nanoscale object 704 was not deposited. A bond is then formed between at least one of the plurality of reactive nanoscale objects 704 deposited on the passive surface 704 and the SPM tip 710. The formation of the bond between at least one of the plurality of reactive nanoscale objects 704 and the SPM tip 710 proceeds in accordance with steps 406 and 407 as described above.

The SPM tip 710 is then moved to a surface target position 714 with the reactive nanoscale object 704 bonded thereto, and a bond is formed between the reactive nanoscale object 704 and the surface target position 714. Breaking the bond between the SPM tip 710 and the reactive nanoscale object 704 leaves the reactive nanoscale object 704 bonded at the surface target position 714.

The positioning of the SPM tip 710 at the surface target position 714, the formation of the bond between the reactive nanoscale object 704 and the surface target position 714, and the breaking of the bond between the SPM tip 710 and the reactive nanoscale object 704 proceed in accordance with steps 408–410 as described above. Further manipulation, such as described above with respect to steps 411–413, can then proceed. According to one embodiment, such further manipulation includes formation of reactive site target positions 712.

According to such an embodiment, a reactive site target position 712 is formed on the nanoscale object 704 bonded at the surface target position 714. Another nanoscale object 704 can then be picked and placed at the reactive site target position 712 formed on the nanoscale object 704 bonded at the surface target position 714. Such picking and placing of another nanoscale object 704 at a reactive site target position 712 formed on the nanoscale object 704 bonded at the surface target position 714 proceeds according to steps 406–409, and as illustrated in FIGS. 8C–8D.

Figure 9A:
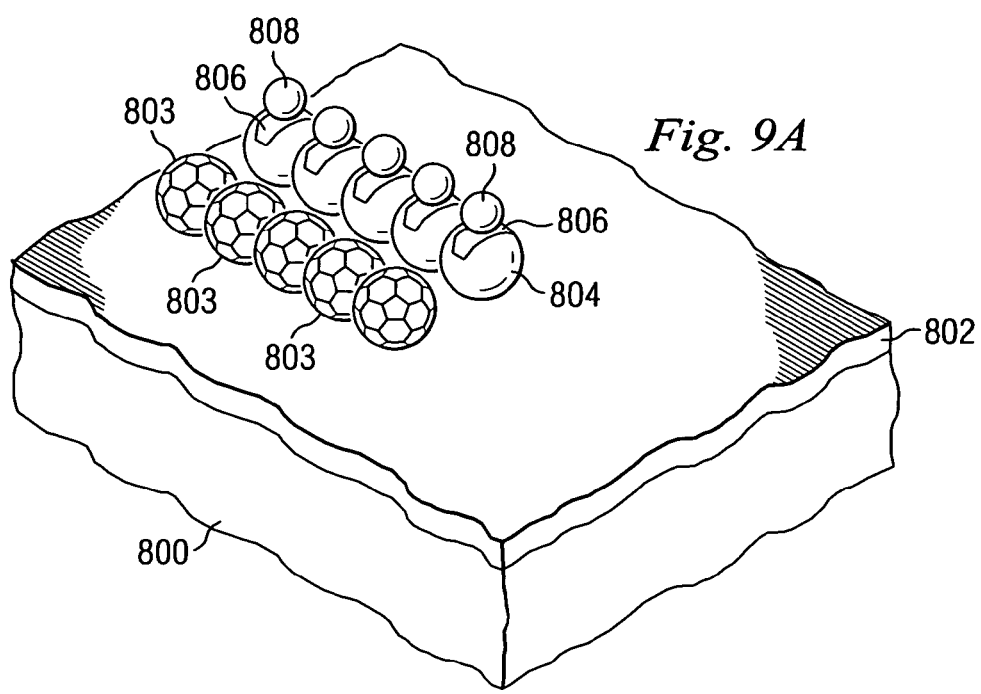
FIG. 9A is a perspective view of a passive surface with a plurality of nanoscale objects and a plurality of reactive nanoscale objects deposited thereon according to the present embodiments.

Referring now to FIGS. 9A–9E, another embodiment of the present methods is illustrated. According to this embodiment, FIG. 9A illustrates a plurality of nanoscale objects 803, at least one of which is a reactive nanoscale object 804, deposited onto one or more portions of a passive surface 802 of a substrate 800. As described above with respect to FIG. 8A, a reactive nanoscale object 804 is a nanoscale object 803 comprising one or more reactive sites 806 covered with a cap 808.

Figure 9B:
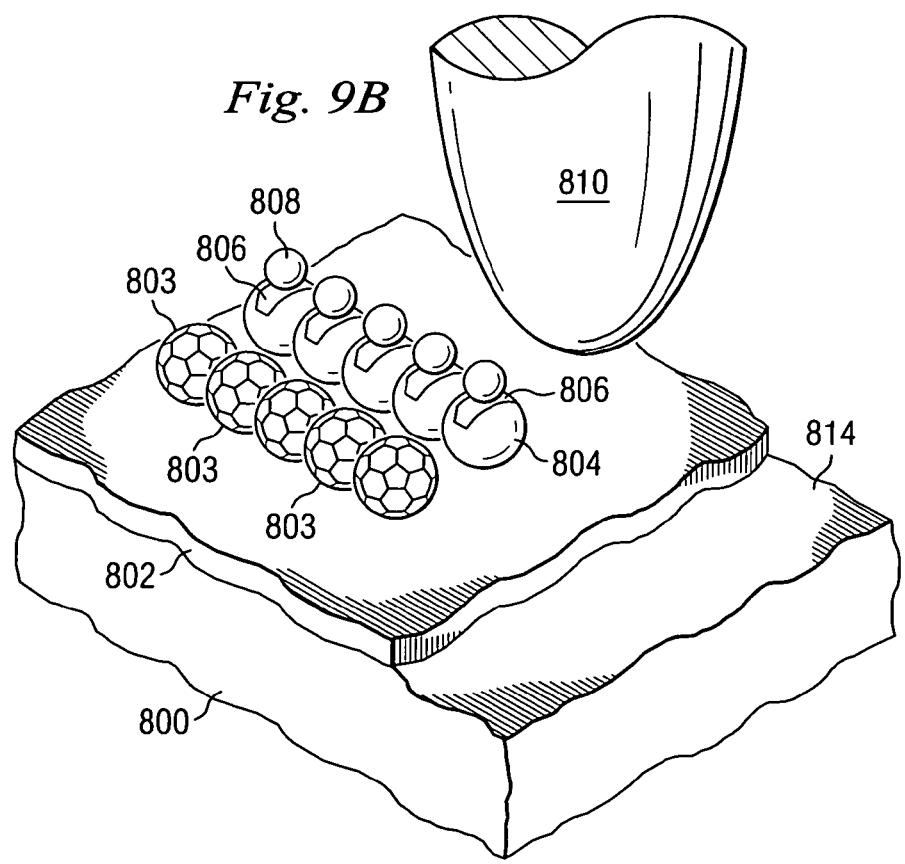
FIG. 9B is a perspective view of the surface of FIG. 9A, with a surface target position 814 formed thereon.

Referring to FIG. 9B, a scanning probe microscope tip 810 operable to act upon the passive surface 802 and on caps 808 is provided. One or more surface target positions 814 are formed on the passive surface 802 by causing the SPM tip 810 to act upon one or more portions of the surface where neither of a nanoscale object 803 or a reactive nanoscale object 804 was deposited.

Referring now to FIG. 9C, a bond is formed between the SPM tip 810 and at least one of the reactive nanoscale objects 804. Alternatively, the bond is formed between at least one of the nanoscale objects 803 and the SPM tip 810. For either embodiment, the bond is formed between the selected object and the SPM tip 810 according to step 406 as previously discussed. With the selected object bonded to the SPM tip 810, the SPM tip 810 is retracted according to step 407 as previously discussed, effectively picking the selected object, which in FIG. 9C is a reactive nanoscale object 804, off of the passive surface 802.

Figure 9D:
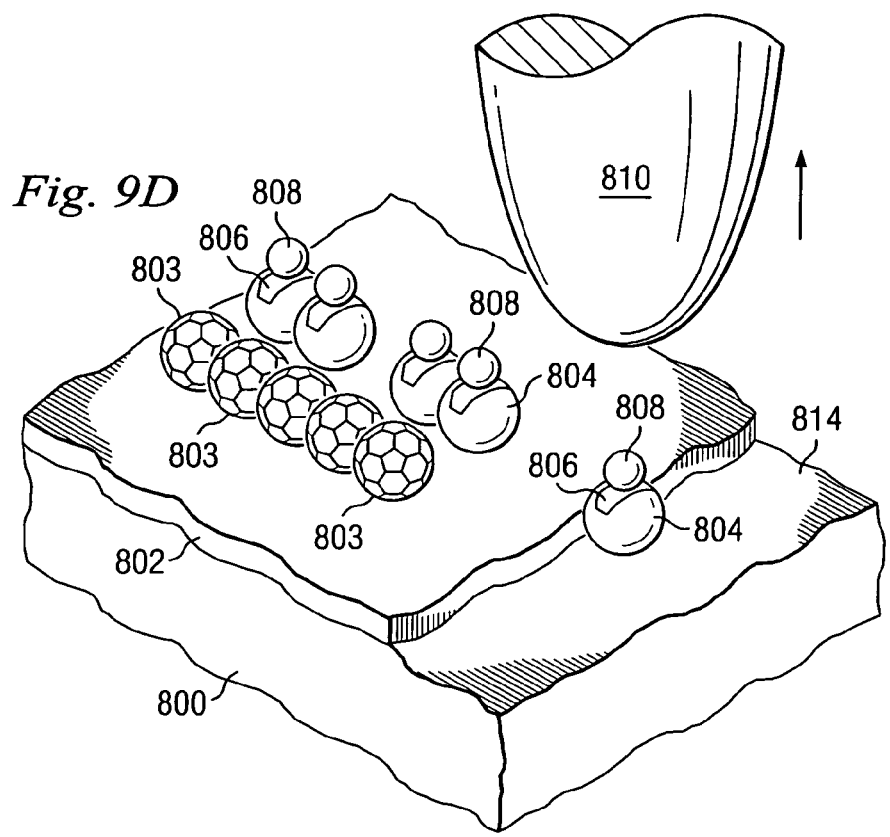
FIG. 9D is a perspective view of the surface of FIG. 9C, where a reactive nanoscale object has been placed at a surface target position.

Referring now to FIG. 9D, the SPM tip 810 with the reactive nanoscale object 804 bonded thereto is positioned at the surface target position 814, and a bond has been formed between the reactive nanoscale object 804 and the surface target position 814. Further, the bond between the SPM tip 810 and the nanoscale object 804 has been broken, leaving the reactive nanoscale object 804 bonded at the surface target position 814. The positioning of the SPM tip 810 at the surface target position 814, the formation of the bond between the nanoscale object 804 and the surface target position 814, and the breaking of the bond between the SPM tip 810 and the nanoscale object proceed according to steps 408–410 as discussed above.

Figure 9E:
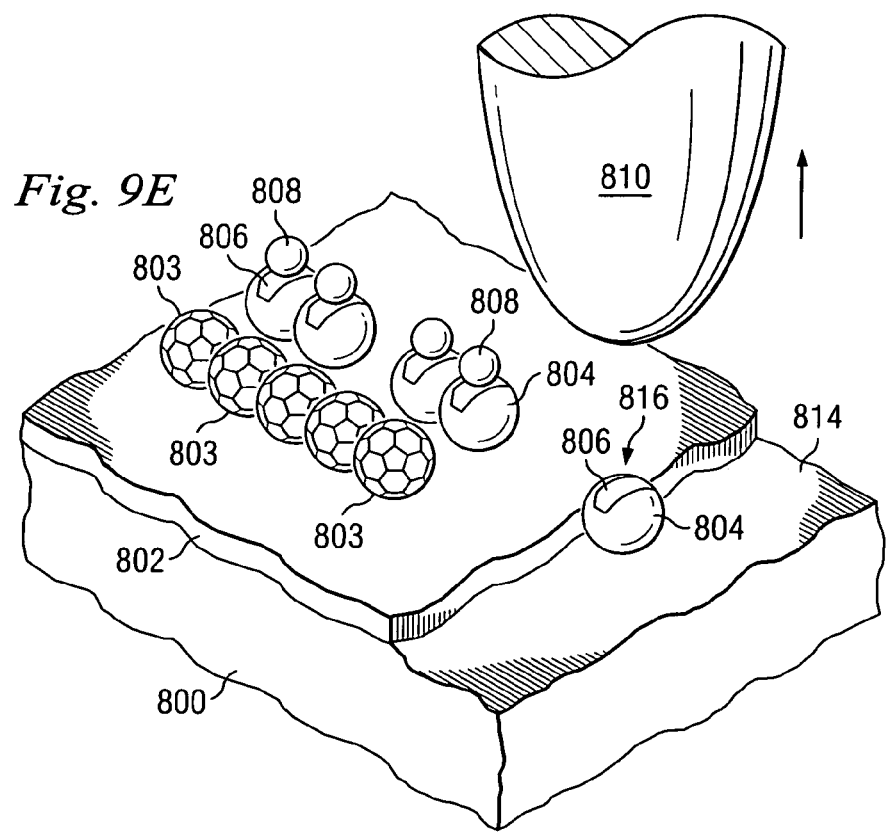
FIG. 9E is a perspective view of the surface of FIG. 9D, where a reactive site target position has been formed on the reactive nanoscale object placed at the surface target position.
Figure 9F:
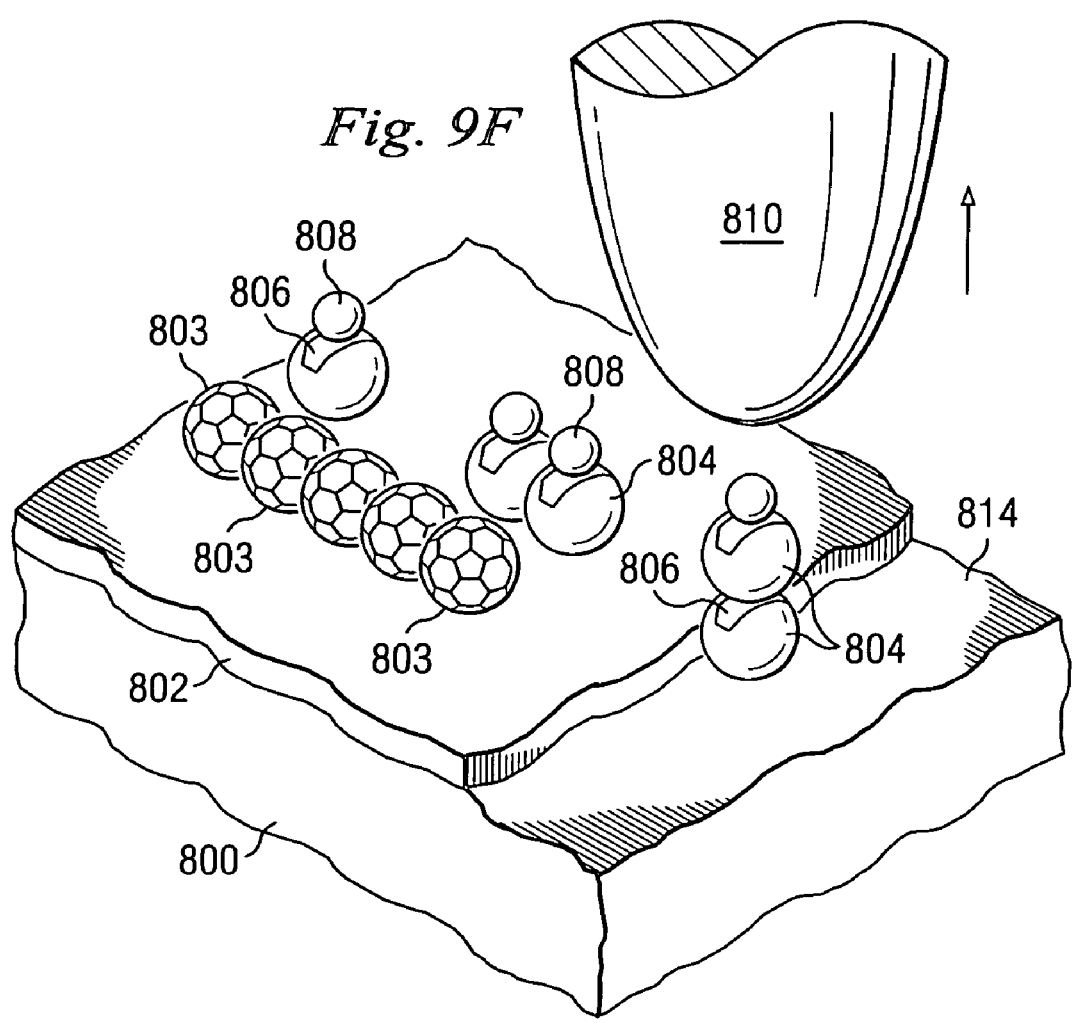
FIG. 9F is a perspective view of the surface of FIG. 9E, where a reactive nanoscale object has been placed at a reactive site target position formed on the object placed at the surface target position.

As illustrated in FIG. 9E, when the object bonded at the surface target position 814 is a reactive nanoscale object 804, a reactive site target position 816 can be formed on the object 804 by causing the SPM tip 810 to remove the cap 808 and expose the reactive site 806. Removing of a cap 808 proceeds as discussed above with respect to step 404 of FIG. 1. Referring now to FIG. 9F, another selected object, either another of the reactive nanoscale objects 804 or a nanoscale object 803, can be picked from the passive surface 802 and placed at the reactive site target position by the SPM tip 810. Picking and placing of the selected object at the reactive site target position 816 proceeds according to steps 406–410 as previously discussed. Namely, a bond is formed between the SPM tip 810 and a second object selected from either the plurality of reactive nanoscale objects 804 or the plurality of nanoscale objects 803. The SPM tip 810 is then moved to the reactive site target position 816, carrying the second selected object bonded thereto along with it. A bond is then formed between the second selected object and the reactive site target position 816, and the bond between the nanoscale object 804 and the SPM tip 810 is broken, thereby leaving the object bonded at the reactive site target position 816.

The present embodiments may perform various operations either through manual operations or through autonomously controlled operations. For example, the placement of nanoscale objects may occur under the control of program logic processed by a suitable control system. FIG. 10 is a high-level diagram of a system 900 that may be utilized to autonomously control fabrication of a nanoscale structure according to the present embodiments. System 900 comprises a processing unit 902, which operates under the control of programmable instructions or code. Processing unit 902 is preferably communicatively coupled to a scanning probe microscope (SPM) 904 by an interface 906 or bus as examples. SPM 904 may be controlled through a suitable program interface, kernel interface, device driver and/or the like. Processing unit 902 may communicate commands to move the tip of an SPM to a specific location, retract the SPM tip, lower the SPM tip, apply a given control parameter (for example a current or voltage), image a substrate surface and/or the like. The interface 906 may also be utilized to communicate suitable signals (for example a tunneling current if the SPM is an STM) for the purpose of controlling the SPM through a feedback loop.

Additionally, processing unit 902 may implement a fabrication design stored in code on a computer readable medium 908 (e.g., hard drive media, optical media, tape media, cartridge media, PROM, EPROM, EEPROM, and/or the like). The fabrication design comprises information on selected locations on a passive surface where target positions are to be formed for the subsequent placement of nanoscale objects.

The stored code may include high-level control algorithms 910, fabrication design parameters 912, and feedback/control algorithms 914. For example, processing unit 902 may cause SPM 904 to image the surface of a substrate. During imaging of the substrate surface, SPM 904 may communicate digital image data to processing unit 902. Processing unit 902 may locate individual nanoscale objects on the surface by executing machine vision algorithms 910. Suitable known high-level control techniques include pattern recognition, path planning and other machine intelligence methods. Additionally, files of fabrication design parameters 912 may define the target positions where nanoscale objects will be placed and where activity on the substrate surface will occur. Feedback control algorithms 914 control the lowering, retracting, and positioning of the SPM tip according to the fabrication parameters 912.

Preferably, the processor is operable to read a computer readable medium and operate under control of algorithms and/or fabrication design parameters to cause the tip of the scanning probe microscope to move to selected target positions of a passive substrate, act upon portions of the passive substrate to form the target positions, such as by de-passivation or activation, and reposition nanoscale objects to the target positions. According to one embodiment of the systems disclosed herein, the control algorithms comprise code for activities including lowering a scanning probe microscope tip into proximity with a passive surface where a target position is to be formed and causing the tip to act upon the passive substrate to form the target position; lowering the tip into proximity with at least one nanoscale object deposited on the passive surface such that a bond forms between the tip and the at least one nanoscale object; positioning the tip with the nanoscale object bonded thereto above a target position and for lowering the tip into proximity with the target position such that a bond forms between the nanoscale object and the target position.

As previously described, the substrate surface can be a passivated surface, an inherently passive surface or a natively passive surface. In particular, the substrate surface can be a hydrogen-terminated semiconductor surface, preferably, a hydrogen-terminated silicon surface. Also as described above, according to embodiments of the systems disclosed herein, the nanoscale objects are fullerene molecules, or more specifically, $C_{60}$ molecules.

The present embodiments may be utilized for any number of applications that may benefit from manipulation on a scale ranging from sub-micron to molecular. Examples of such applications include but are not limited to, flexible fabrication of devices on a scale ranging from sub-micron to molecular, fabrication of high-conductivity traces of nanoscale objects to or within electronic and/or mechanical devices, and fabrication of nano-memory cells. Picking and placing of nanoscale objects according to the present embodiments may be used to place nanoscale objects onto predetermined sites on an integrated device or circuit to create a structure, which can not be fabricated by traditional processing alone. Furthermore, the present embodiments are not limited to unprocessed substrates having only a passive surface thereon, but may also be utilized with a substrate that is pre-processed to some degree (for example, lithography).

The present embodiments can be utilized with any of a number of SPMs, including but not limited to a scanning tunneling microscope (STM), an atomic force microscope (AFM), near-field scanning optical microscopes (NSOM), scanning tunneling optical microscopes (STOM), near-field scanning acoustical microscopes (NSAM), scanning capacitance microscopes (SCM), and scanning electrochemistry microscopes (SECM).

Moreover, although the present embodiments have been described in terms of utilizing an SPM to perform molecular manipulation, the present embodiments are not so limited. Any suitable hybrid device for performing manipulation of nanoscale objects can be used with the present embodiments. In addition, any device or combination of devices that is capable of achieving a resolution that is compatible with the size of a nanoscale object, possesses suitable chemical properties at a manipulating tip, and is capable of transferring energy to a passive surface to create suitable reactive sites may used with the present embodiments.

Although the present embodiments have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As those of ordinary skill in the art will readily appreciate from the present disclosure, any processes, machines, manufactures, compositions of matter, means, methods, or steps, presently existing or later to be developed, that perform substantially the same function or achieve substantially the same result as the corresponding embodiments described herein may be utilized according to the present embodiments. Accordingly, the appended claims are intended to include within their scope such processes, machines, manufactures, compositions of matter, means, methods, or steps.

What is claimed is:

1. A method for manipulating a nanoscale object comprising:
   depositing a plurality of reactive nanoscale objects onto one or more portions of a passive surface of a substrate wherein each of the plurality of nanoscale objects has one or more reactive sites covered with a cap;
   providing a scanning probe microscope having a tip operable to act upon the passive surface and the cap;
   forming a reactive site target position on at least one of the plurality of reactive nanoscale objects by causing the scanning probe microscope tip to remove the cap;
   forming a bond between the scanning probe microscope tip and another of the plurality of reactive nanoscale objects;
   moving the scanning probe microscope tip with the another reactive nanoscale object bonded thereto to the reactive site target position;
   forming a bond between the reactive site target position and the another reactive nanoscale object bonded to the scanning probe microscope tip; and
   breaking the bond between the scanning probe microscope tip and the another reactive nanoscale object.

2. The method of claim 1 further comprising, prior to the forming of the bond between the scanning probe microscope tip and another of the plurality of reactive nanoscale objects:
   forming one or more surface target positions on the passive surface by causing the tip of the scanning probe microscope to act upon one or more portions of the passive surface where a reactive nanoscale object was not deposited;
   forming a bond between at least one of the plurality of reactive nanoscale objects mud the scanning probe microscope tip;
   moving the scanning probe microscope tip with the at least one motive nanoscale object bonded thereto to one of the surface target positions;
   forming a bond between the reactive nanoscale object and the surface target position; and
   breaking the bond between the scanning probe microscope tip and the reactive nanoscale object.

3. The method of claim 2 wherein the forming a reactive site target position on at least one of the plurality of reactive nanoscale objects comprises causing the scanning probe microscope tip to remove the cap on the reactive nanoscale object bonded at the surface target position.

4. The method of claim 1 wherein the moving of the scanning probe microscope tip with the at least one reactive nanoscale object bonded thereto to one of the surface target positions comprises:

moving the scanning probe microscope tip in an upward direction relative to the plane in which the passive surface lies;

moving the scanning probe tip in a direction parallel to the plane in which the passive surface lies and toward the surface target position; and moving the scanning probe microscope tip in a downward direction relative to the plane in which the surface target position lies.

5. The method of claim 1 wherein the passive surface comprises a surface selected from a hydrogen-terminated semiconductor surface, an inherently passive surface and a natively passive surface.

6. The method of claim 1 wherein the passive surface comprises a surface selected from a hydrogen-terminated silicon surface, a graphite surface and a mica surface.

7. The method of claim 1 wherein the passive surface comprises an inherently passive surface and the acting of the scanning probe microscope tip on the passive surface to form one or more surface target positions comprises at least one of breaking bonds within the surface end locally oxidizing the surface.

8. The method of claim 1 wherein the passive surface comprises a hydrogen-terminated semiconductor surface, and the acting of the scanning probe microscope tip on the passive surface comprises removing at least one hydrogen atom front the passive surface.

9. The method of claim 1 wherein the scanning probe microscope is selected from the group consisting of: scanning tunneling microscopes (STM); atomic force microscopes (AFM); near-field scanning optical microscopes (NSOM); scanning tunneling optical microscopes (STOM); near-field scanning acoustical microscopes (NSAM); scanning capacitance microscopes (SCM); and scanning electrochemistry microscopes (SECM).

10. The method of claim 1 wherein the forming a bond between the scanning probe microscope tip and another of the plurality of reactive nanoscale objects comprises moving the scanning probe microscope tip toward the plurality of reactive nanoscale objects to a proximity sufficient to cause the forming of the bond between the scanning probe microscope tip and another of the plurality of reactive nanoscale objects.

11. The method of claim 1 wherein the forming of the bond between the reactive site target position and the another reactive nanoscale object bonded to the scanning probe microscope tip comprises moving the scanning probe microscope tip to bring the another reactive nanoscale object into proximity with the reactive site target position sufficient to cause the forming of the bond between the reactive site target position and the another reactive nanoscale object.

12. The method of claim 1 wherein the passive surface lies in more than one plane.

13. The method of claim 1 wherein the plurality of reactive nanoscale objects comprise at least one of atoms, molecules, dendrimers, macro-molecules, viruses, phages, colloids, clusters, nanoparticles and nano-devices.

14. A method for manipulating a nanoscale object comprising:

depositing a plurality of nanoscale objects onto one or more portions of a passive surface of a substrate wherein at least one of the nanoscale objects comprises a reactive site covered with a cap;

providing a scanning probe microscope having a tip operable to act upon the passive surface and the cap;

forming one or more surface target positions on the passive surface by causing the tip of the scanning probe microscope to act upon one or more portions of to passive surface where a nanoscale object is not deposited;

forming a bond between the scanning probe microscope tip and at least one selected object from the plurality of nanoscale objects;

moving the scanning probe microscope tip with the at least one selected object bonded thereto to one of the surface target positions;

forming a bond between the at lent one selected object and the surface target position; and breaking the bond between the scanning probe microscope tip and the at least one selected object to leave the at least one selected object bonded at the surface target position.

15. The method of claim 14 wherein the at least one selected object comprises a nanoscale object comprising a reactive site covered with a cap, and comprising:

forming a reactive site target position on the nanoscale object bonded at the surface target position by causing the scanning probe microscope tip remove the cap;

forming a bond between the scanning probe microscope tip and a second selected object from the plurality of nanoscale objects;

moving the scanning probe microscope tip with the second selected object bonded thereto to the reactive site target position;

forming a bond between the second object and the reactive site target position; and breaking the bond between the scanning probe microscope tip the second object.

16. The method of claim 14 wherein the moving of the scanning probe microscope tip with the at least one selected object bonded thereto to one of the surface target positions comprises:

moving the scanning probe microscope tip in an upward direction relative to the plane in which the passive surface lies;

moving the scanning probe microscope tip in a direction parallel to the plane in which the passive surface lies and toward the surface target position; and moving the scanning probe microscope tip in a downward direction relative to the plane in which the surface target position lies.

17. The method of claim 14 wherein the passive surface comprises a surface selected from a hydrogen-terminated semiconductor surface, an inherently passive surface and a natively passive surface.

18. The method of claim 14 wherein the passive surface comprises a surface selected from a hydrogen-terminated silicon surface, a graphite surface and a mica surface.

19. The method of claim 14 wherein the passive surface comprises an inherently passive surface and the acting of the scanning probe microscope tip on the passive surface to form one or more surface target positions comprises at least one of breaking bonds within the surface and locally oxidizing the surface.

20. The method of claim 14 wherein the passive surface comprises a hydrogen-terminated semiconductor surface, and the acting of the scanning probe microscope tip on the passive surface comprises removing at least one hydrogen atom from the passive surface.

21. The method of claim 14 wherein the scanning probe microscope is selected from the group consisting of: scanning tunneling microscopes (STM), atomic force microscopes (AFM); near-field scanning optical microscope (NSOM); scanning tunneling optical microscopes (STOM); near-field scanning acoustical microscope. (NSAM); scanning capacitance microscopes (SCM); mid scanning electrochemistry microscopes (SECM).

22. The method of claim 14 wherein the passive surface lies in more than one plane.

23. The method of claim 14 wherein the plurality of reactive nanoscale objects comprise at least one atoms, molecules, dendrimers, macro-molecules, viruses, phages colloids, clusters, nanoparticles and nano-devices.

* * * * *

UNITED STATES PATENT AND TRADEMARK OFFICE
CERTIFICATE OF CORRECTION

PATENT NO. : 6,987,277 B2  
DATED : January 17, 2006  
INVENTOR(S) : Christof Baur and Richard E. Stallcup II Page 1 of 1

It is certified that error appears in the above-identified patent and that said Letters Patent is hereby corrected as shown below:

Column 20,  
Line 49, "mud" should read -- and --.  
Line 52, "motive" should read -- reactive --.

Column 21,  
Line 4, insert -- microscope -- between "probe" and "tip".  
Line 21, "end" should read -- and --.  
Line 27, "front" should read -- from --.

Column 22,  
Line 1, "portions of to" should read -- portions of the --.  
Line 11, "lent" should read -- least --.  
Line 23, insert -- to -- between "tip" and "remove".  
Line 34, "tip the second" should read -- tip and the second --.

Column 23,  
Lines 4 and 6, "microscope" should read -- microscopes --.  
Line 7, "mid" should read -- and --.

Signed and Sealed this

Twenty-eighth Day of March, 2006

JON W. DUDAS  
*Director of the United States Patent and Trademark Office*